United States Patent [19]

Alferness et al.

[11] Patent Number: 5,577,259
[45] Date of Patent: Nov. 19, 1996

[54] INSTRUCTION PROCESSOR CONTROL SYSTEM USING SEPARATE HARDWARE AND MICROCODE CONTROL SIGNALS TO CONTROL THE PIPELINED EXECUTION OF MULTIPLE CLASSES OF MACHINE INSTRUCTIONS

[75] Inventors: Merwin H. Alferness, New Brighton; John S. Kuslak, Blaine; Mark A. Vasquez, Circle Pines; Joseph P. Kerzman, Spring Lake Park, all of Minn.; Eric S. Collins, Naperville, Ill.

[73] Assignee: Unisys Corporation, Blue Bell, Pa.

[21] Appl. No.: 288,651

[22] Filed: Aug. 9, 1994

Related U.S. Application Data

[63] Continuation of Ser. No. 762,282, Sep. 19, 1991, abandoned.

[51] Int. Cl.$^6$ ....................................................... G06F 9/72
[52] U.S. Cl. .................. 395/800; 395/376; 364/DIG. 1; 364/262.8; 364/262.4; 364/275.6; 364/263.1
[58] Field of Search ..................................... 395/800, 375

[56] References Cited

U.S. PATENT DOCUMENTS

| | | | |
|---|---|---|---|
| 4,992,934 | 2/1991 | Partanova et al. | 395/375 |
| 5,136,696 | 8/1992 | Berkwith et al. | 395/375 |
| 5,222,244 | 6/1993 | Carbine et al. | 395/800 |

OTHER PUBLICATIONS

Myers et al. *The 80960 Microprocessor Architecture*; 1988; 159–183.

Bandyopadhyay et al, "Mirco-code RISC Architecture" Mar. 1987.

Bandyopadhyay et al "Combining Both Micro-Code and Hardwire Control in RISC, Computer Architecture News", Sep. 1987.

Hinton et al "Microarchitecture of the 80960 High Integration Processor" 1988.

*Primary Examiner*—Larry D. Donaghue
*Attorney, Agent, or Firm*—Charles A. Johnson; Mark T. Starr

[57] ABSTRACT

A digital instruction processor control system for an instruction processor having a multiple stage instruction execution pipeline capable of executing binary instructions in fixed predetermined stages. The control system includes a hardware controller to generate control signals for execution of all pipeline stages of standard instructions and for the first stage of extended cycle instructions and provides a main microcode controller to provide programmed control signals for controlling all subsequent stages of execution of extended cycle instructions. The control system also utilizes a separate sequence microcode controller for execution of certain instructions of a predetermined type including decimal instruction execution, during which time the main microcode controller is under control of the separate sequence controller.

30 Claims, 33 Drawing Sheets

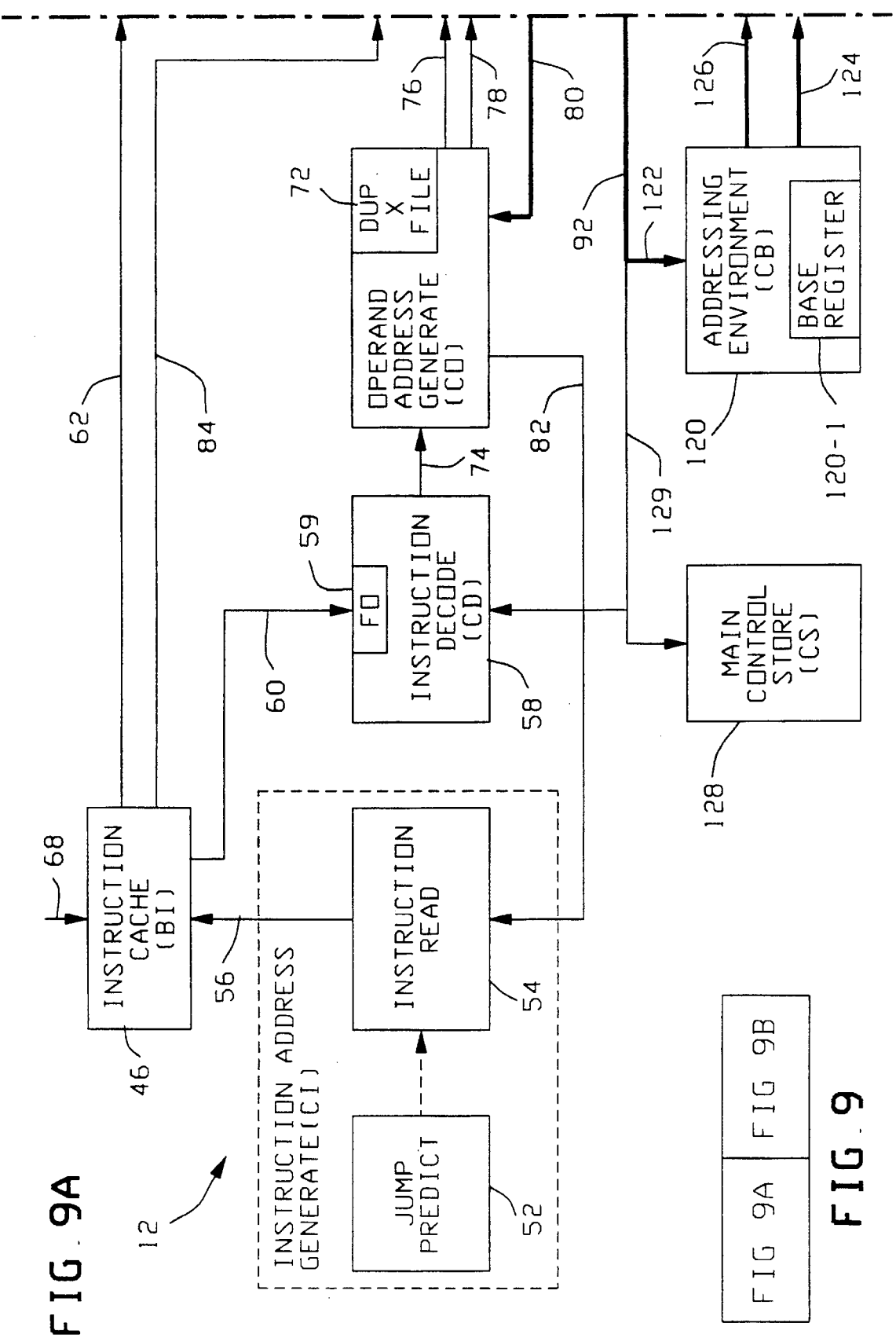

| FIG 11A |
| FIG 11B |

| | ENCODED VECTOR | OP-CODES F J A | MNEMONIC | PROCESSOR PRIVILAGE |
|---|---|---|---|---|
| 1 | .0000 | 00 | ILL$E000 | PP_3 |
| 2 | .0001 | 01 | SA$E | PP_3 |
| 3 | .0002 | 02 | SNA$E | PP_3 |
| 4 | .0003 | 03 | SMA$E | PP_3 |
| 5 | .0004 | 04 | SR$E | PP_3 |
| 6 | .0006 | 06 | SX$E | PP_3 |
| 7 | .0010 | 10 | LA$E | PP_3 |
| 8 | .0011 | 11 | LNA$E | PP_3 |
| 9 | .0012 | 12 | LMA$E | PP_3 |
| 10 | .0013 | 13 | LNMA$E | PP_3 |
| 11 | .0014 | 14 | AA$E | PP_3 |
| 12 | .0015 | 15 | ANA$E | PP_3 |
| 13 | .0016 | 16 | AMA$E | PP_3 |
| 14 | .0017 | 17 | ANMA$E | PP_3 |
| 15 | .0020 | 20 | AU$E | PP_3 |
| 16 | .0021 | 21 | ANU$E | PP_3 |
| 17 | .0022 | 22 | BT$E | PP_3 |
| 18 | .0023 | 23 | LR$E | PP_3 |
| 19 | .0024 | 24 | AX$E | PP_3 |
| 20 | .0025 | 25 | ANX$E | PP_3 |
| 21 | .0026 | 26 | LXM$E | PP_3 |
| 22 | .0027 | 27 | LX$E | PP_3 |
| 23 | .0030 | 30 | MI$E | PP_3 |
| 24 | .0031 | 31 | MSI$E | PP_3 |
| 25 | .0032 | 32 | MF$E | PP_3 |
| 26 | .0034 | 34 | DI$E | PP_3 |
| 27 | .0035 | 35 | DSF$E | PP_3 |
| 28 | .0036 | 36 | DF$E | PP_3 |
| 29 | .0040 | 40 | OR$E | PP_3 |
| 30 | .0041 | 41 | XOR$E | PP_3 |
| 31 | .0042 | 42 | AND$E | PP_3 |
| 32 | .0043 | 43 | MLU$E | PP_3 |
| 33 | .0044 | 44 | TEP$E | PP_3 |
| 34 | .0045 | 45 | TOP$E | PP_3 |
| 35 | .0046 | 46 | LXI$E | PP_3 |
| 36 | .0047 | 47 | TLEM$E | PP_3 |
| 37 | .0051 | 51 | LXSI$E | PP_3 |
| 38 | .0052 | 52 | TE$E | PP_3 |
| 39 | .0053 | 53 | TNE$E | PP_3 |
| 40 | .0054 | 54 | TLE$E | PP_3 |
| 41 | .0055 | 55 | TG$E | PP_3 |
| 42 | .0056 | 56 | TW$E | PP_3 |
| 43 | .0057 | 57 | TNW$E | PP_3 |
| 44 | .0060 | 60 | LSBO$E | PP_3 |
| 45 | .0061 | 61 | LSBL$E | PP_3 |

FIG. 12-A

| ENCODED VECTOR | OP-CODES F | J | A | MNEMONIC | PROCESSOR PRIVILAGE |
|---|---|---|---|---|---|
| 46 | .0062 | 62 | | ILL$E062 | PP_3 |
| 47 | .0063 | 63 | | ILL$E063 | PP_3 |
| 48 | .0064 | 64 | | ILL$E064 | PP_3 |
| 49 | .0065 | 65 | | ILL$E065 | PP_3 |
| 50 | .0066 | 66 | | ILL$E066 | PP_3 |
| 51 | .0067 | 67 | | ILL$E067 | PP_3 |
| 52 | .0070 | 70 | | JGD$E | PP_3 |
| 53 | .0077 | 77 | | ILL$E077 | PP_3 |
| 54 | .0100 | 73 | 14 | 00 | NOP$E | PP_3 |
| 55 | .0101 | 73 | 14 | 01 | LPM$E | PP_3 |
| 56 | .0102 | 73 | 14 | 02 | BUY$E | PP_3 |
| 57 | .0103 | 73 | 14 | 03 | SELL$E | PP_3 |
| 58 | .0104 | 73 | 14 | 04 | ER$E | PP_3 |
| 59 | .0105 | 73 | 14 | 05 | EX$E | PP_3 |
| 60 | .0106 | 73 | 14 | 06 | EXR$E | PP_3 |
| 61 | .0107 | 73 | 14 | 07 | BIMT$E | PP_3 |
| 62 | .0110 | 73 | 14 | 10 | BIM$E | PP_3 |
| 63 | .0111 | 73 | 14 | 11 | BIML$E | PP_3 |
| 64 | .0112 | 73 | 14 | 12 | BIC$E | PP_3 |
| 65 | .0113 | 73 | 14 | 13 | BICL$E | PP_3 |
| 66 | .0114 | 73 | 14 | 14 | LINC$E | PP_0 |
| 67 | .0115 | 73 | 14 | 15 | SINC$E | PP_2 |
| 68 | .0116 | 73 | 14 | 16 | LCC$E | PP_0 |
| 69 | .0117 | 73 | 14 | 17 | SCC$E | PP_2 |
| 70 | .0120 | 73 | 15 | 00 | ILL$E120 | PP_3 |
| 71 | .0121 | 73 | 15 | 01 | ILL$E121 | PP_3 |
| 72 | .0122 | 73 | 15 | 02 | LBRX$E | PP_0 |
| 73 | .0123 | 73 | 15 | 03 | ACEL$E | PP_2 |
| 74 | .0124 | 73 | 15 | 04 | DCEL$E | PP_2 |
| 75 | .0125 | 73 | 15 | 05 | SPID$E | PP_2 |
| 76 | .0126 | 73 | 15 | 06 | DABT$E | PP_1 |
| 77 | .0127 | 73 | 15 | 07 | SEND$E | PP_0 |
| 78 | .0130 | 73 | 15 | 10 | ACK$E | PP_0 |
| 79 | .0131 | 73 | 15 | 11 | ILL$E131 | PP_3 |
| 80 | .0132 | 73 | 15 | 12 | LAE$E | PP_0 |
| 81 | .0133 | 73 | 15 | 13 | SKQT$E | PP_1 |
| 82 | .0134 | 73 | 15 | 14 | LD$E | PP_0 |
| 83 | .0135 | 73 | 15 | 15 | SD$E | PP_1 |
| 84 | .0136 | 73 | 15 | 16 | UR$E | PP_0 |
| 85 | .0137 | 73 | 15 | 17 | SGNL$E | PP_3 |
| 86 | .0140 | 05 | -- | 00 | SZ$E | PP_3 |
| 87 | .0141 | 05 | -- | 01 | SNZ$E | PP_3 |
| 88 | .0142 | 05 | -- | 02 | SP1$E | PP_3 |
| 89 | .0143 | 05 | -- | 03 | SN1$E | PP_3 |
| 90 | .0144 | 05 | -- | 04 | SFS$E | PP_3 |

FIG. 12-B

|  | ENCODED VECTOR | OP-CODES F | OP-CODES J | OP-CODES A | MNEMONIC | PROCESSOR PRIVILAGE |
|---|---|---|---|---|---|---|
| 91 | .0145 | 05 | -- | 05 | SFZ$E | PP_3 |
| 92 | .0146 | 05 | -- | 06 | SAS$E | PP_3 |
| 93 | .0147 | 05 | -- | 07 | SAZ$E | PP_3 |
| 94 | .0150 | 05 | -- | 10 | INC$E | PP_3 |
| 95 | .0151 | 05 | -- | 11 | DEC$E | PP_3 |
| 96 | .0152 | 05 | -- | 12 | INC2$E | PP_3 |
| 97 | .0153 | 05 | -- | 13 | DEC2$E | PP_3 |
| 98 | .0154 | 05 | -- | 14 | ENZ$E | PP_3 |
| 99 | .0155 | 05 | -- | 15 | ADD1$E | PP_3 |
| 100 | .0156 | 05 | -- | 16 | SUB1$E | PP_3 |
| 101 | .0157 | 05 | -- | 17 | ILL$E157 | PP_3 |
| 102 | .0160 | 73 | 17 | 00 | TS$E | PP_3 |
| 103 | .0161 | 73 | 17 | 01 | TSS$E | PP_3 |
| 104 | .0162 | 73 | 17 | 02 | TCS$E | PP_3 |
| 105 | .0163 | 73 | 17 | 03 | RTN$E | PP_3 |
| 106 | .0164 | 73 | 17 | 04 | LUD$E | PP_3 |
| 107 | .0165 | 73 | 17 | 05 | SUD$E | PP_3 |
| 108 | .0166 | 73 | 17 | 06 | IAR$E | PP_0 |
| 109 | .0167 | 73 | 17 | 07 | ILL$E | PP_3 |
| 110 | .0170 | 73 | 17 | 10 | IPC$E | PP_0 |
| 111 | .0171 | 73 | 17 | 11 | CJHE$E | PP_0 |
| 112 | .0172 | 73 | 17 | 12 | SYSC$E | PP_0 |
| 113 | .0173 | 73 | 17 | 13 | LATP$E | PP_0 |
| 114 | .0174 | 73 | 17 | 14 | INV$E | PP_1 |
| 115 | .0175 | 73 | 17 | 15 | SJH$E | PP_0 |
| 116 | .0176 | 73 | 17 | 16 | ILL$E176 | PP_3 |
| 117 | .0177 | 73 | 17 | 17 | ILL$E177 | PP_3 |
| 118 | .0240 | 74 | 14 | 00 | JO$E | PP_3 |
| 119 | .0241 | 74 | 14 | 01 | JFU$E | PP_3 |
| 120 | .0242 | 74 | 14 | 02 | JFO$E | PP_3 |
| 121 | .0243 | 74 | 14 | 03 | JDF$E | PP_3 |
| 122 | .0244 | 74 | 14 | 04 | JC$E | PP_3 |
| 123 | .0245 | 74 | 14 | 05 | JNC$E | PP_3 |
| 124 | .0246 | 74 | 14 | 06 | AAIJ$E | PP_0 |
| 125 | .0247 | 74 | 14 | 07 | PAIJ$E | PP_0 |
| 126 | .0250 | 74 | 14 | 10 | ILL$E250 | PP_3 |
| 127 | .0251 | 74 | 14 | 11 | ILL$E251 | PP_3 |
| 128 | .0252 | 74 | 14 | 12 | IIL$E252 | PP_3 |
| 129 | .0253 | 74 | 14 | 13 | ILL$E253 | PP_3 |
| 130 | .0254 | 74 | 14 | 14 | ILL$E254 | PP_3 |
| 131 | .0255 | 74 | 14 | 15 | ILL$E255 | PP_3 |
| 132 | .0256 | 74 | 14 | 16 | ILL$E256 | PP_3 |
| 133 | .0257 | 74 | 14 | 17 | ILL$E257 | PP_3 |
| 134 | .0260 | 74 | 15 | 00 | JNO$E | PP_3 |
| 135 | .0261 | 74 | 15 | 01 | JNFU$E | PP_3 |

FIG. 12-C

| ENCODED VECTOR | OP-CODES F | J | A | MNEMONIC | PROCESSOR PRIVILAGE |
|---|---|---|---|---|---|
| 136 .0262 | 74 | 14 | 02 | JNFO$E | PP_3 |
| 137 .0263 | 74 | 15 | 03 | JNDF$E | PP_3 |
| 138 .0264 | 74 | 15 | 04 | J$E | PP_3 |
| 139 .0265 | 74 | 15 | 05 | HLTJ$E | PP_3 |
| 140 .0266 | 74 | 15 | 06 | ILL$E266 | PP_3 |
| 141 .0267 | 74 | 15 | 07 | ILL$E267 | PP_3 |
| 142 .0270 | 74 | 15 | 10 | ILL$E270 | PP_3 |
| 143 .0271 | 74 | 15 | 11 | ILL$E271 | PP_3 |
| 144 .0272 | 74 | 15 | 12 | ILL$E272 | PP_3 |
| 145 .0273 | 74 | 15 | 13 | ILL$E273 | PP_3 |
| 146 .0274 | 74 | 15 | 14 | ILL$E274 | PP_3 |
| 147 .0275 | 74 | 15 | 15 | ILL$E275 | PP_3 |
| 148 .0276 | 74 | 15 | 16 | ILL$E276 | PP_3 |
| 149 .0277 | 74 | 15 | 17 | ILL$E277 | PP_3 |
| 150 .0300 | 37 | 04 | 00 | SMD$E | PP_0 |
| 151 .0301 | 37 | 04 | 01 | SDMN$E | PP_0 |
| 152 .0302 | 37 | 04 | 02 | SDMF$E | PP_0 |
| 153 .0303 | 37 | 04 | 03 | SDMS$E | PP_0 |
| 154 .0304 | 37 | 04 | 04 | ILL$E304 | PP_3 |
| 155 .0320 | 33 | 00 | | FDA$E | PP_3 |
| 156 .0321 | 33 | 01 | | FDAN$E | PP_3 |
| 157 .0322 | 33 | 02 | | FDM$E | PP_3 |
| 158 .0323 | 33 | 03 | | FDD$E | PP_3 |
| 159 .0324 | 33 | 04 | | DESF$E | PP_3 |
| 160 .0325 | 33 | 05 | | FDSP$E | PP_3 |
| 161 .0326 | 33 | 06 | | FDR$E | PP_3 |
| 162 .0327 | 33 | 07 | | FDT$E | PP_3 |
| 163 .0330 | 33 | 10 | | LS$E | PP_3 |
| 164 .0331 | 33 | 11 | | LSA$E | PP_3 |
| 165 .0332 | 33 | 12 | | SS$E | PP_3 |
| 166 .0333 | 33 | 13 | | TGM$E | PP_3 |
| 167 .0334 | 33 | 14 | | DTGM$E | PP_3 |
| 168 .0335 | 33 | 15 | | DCB$E | PP_3 |
| 169 .0336 | 33 | 16 | | ILL$E336 | PP_3 |
| 170 .0337 | 33 | 17 | | ILL$E337 | PP_3 |
| 171 .0340 | 37 | 06 | 00 | SLP0$E | PP_0 |
| 172 .0341 | 37 | 06 | 01 | SLP1$E | PP_0 |
| 173 .0360 | 37 | 00 | | LRD$E | PP_0 |
| 174 .0361 | 37 | 01 | | RRD$E | PP_0 |
| 175 .0362 | 37 | 02 | | LRC$E | PP_0 |
| 176 .0363 | 37 | 03 | | RRC$E | PP_0 |
| 177 .0367 | 37 | 07 | | LMC$E | PP_0 |
| 178 .0370 | 37 | 10 | | ILL$E370 | PP_3 |
| 179 .0371 | 37 | 11 | | ILL$E371 | PP_3 |
| 180 .0372 | 37 | 12 | | ILL$E372 | PP_3 |

FIG. 12-D

|     | ENCODED VECTOR | OP-CODES F | J | A | MNEMONIC | PROCESSOR PRIVILAGE |
|-----|----------------|------------|-----|-------|----------|---------------------|
| 181 | .0373 | 37 | 13 |       | ILL$E373 | PP_3 |
| 182 | .0374 | 37 | 14 |       | ILL$E374 | PP_3 |
| 183 | .0375 | 37 | 15 |       | ILL$E375 | PP_3 |
| 184 | .0376 | 37 | 16 |       | ILL$E376 | PP_3 |
| 185 | .0377 | 37 | 17 |       | ILL$E377 | PP_3 |
| 186 | .0400 | 05 |    | 16-17 | NOP5$E   | PP_3 |
| 187 | .0401 | 01 |    | 16-17 | PRBA$E   | PP_3 |
| 188 | .0402 | 02 |    | 16-17 | SIMX$E   | PP_3 |
| 189 | .0403 | 03 |    | 16-17 | PRBC$E   | PP_3 |
| 190 | .0404 | 04 |    | 16-17 | NOP4$E   | PP_3 |
| 191 | .0405 |    |    |       | ILL$E405 | PP_3 |
| 192 | .0406 |    |    |       | ILL$E406 | PP_3 |
| 193 | .0407 |    |    |       | ILL$E407 | PP_3 |
| 194 | .0410 |    |    |       | ILL$E410 | PP_3 |
| 195 | .0411 |    |    |       | ILL$E411 | PP_3 |
| 196 | .0412 |    |    |       | ILL$E412 | PP_3 |
| 197 | .0413 |    |    |       | ILL$E413 | PP_3 |
| 198 | .0414 |    |    |       | ILL$E414 | PP_3 |
| 199 | .0415 |    |    |       | ILL$E415 | PP_3 |
| 200 | .0416 |    |    |       | ILL$E416 | PP_3 |
| 201 | .0417 |    |    |       | ILL$E417 | PP_3 |
| 202 | .0420 |    |    |       | ILL$E420 | PP_3 |
| 203 | .0421 |    |    |       | ILL$E421 | PP_3 |
| 204 | .0422 |    |    |       | ILL$E422 | PP_3 |
| 205 | .0423 |    |    |       | ILL$E423 | PP_3 |
| 206 | .0424 |    |    |       | ILL$E424 | PP_3 |
| 207 | .0425 |    |    |       | ILL$E425 | PP_3 |
| 208 | .0426 |    |    |       | ILL$E426 | PP_3 |
| 209 | .0427 |    |    |       | ILL$E427 | PP_3 |
| 210 | .0430 |    |    |       | ILL$E430 | PP_3 |
| 211 | .0431 |    |    |       | ILL$E431 | PP_3 |
| 212 | .0432 |    |    |       | ILL$E432 | PP_3 |
| 213 | .0433 |    |    |       | ILL$E433 | PP_3 |
| 214 | .0434 |    |    |       | ILL$E434 | PP_3 |
| 215 | .0435 |    |    |       | ILL$E435 | PP_3 |
| 216 | .0436 |    |    |       | ILL$E436 | PP_3 |
| 217 | .0437 |    |    |       | ILL$E437 | PP_3 |
| 218 | .0440 |    |    |       | ILL$E440 | PP_3 |
| 219 | .0441 |    |    |       | ILL$E441 | PP_3 |
| 220 | .0442 |    |    |       | ILL$E442 | PP_3 |
| 221 | .0443 |    |    |       | ILL$E443 | PP_3 |
| 222 | .0444 |    |    |       | ILL$E444 | PP_3 |
| 223 | .0445 |    |    |       | ILL$E445 | PP_3 |
| 224 | .0446 |    |    |       | ILL$E446 | PP_3 |
| 225 | .0447 |    |    |       | ILL$E447 | PP_3 |

FIG. 12-E

|  | ENCODED VECTOR | OP-CODES F | J | A | MNEMONIC | PROCESSOR PRIVILAGE |
|---|---|---|---|---|---|---|
| 226 | .0450 | | | | ILL$E450 | PP_3 |
| 227 | .0451 | | | | ILL$E451 | PP_3 |
| 228 | .0452 | | | | ILL$E452 | PP_3 |
| 229 | .0453 | | | | ILL$E453 | PP_3 |
| 230 | .0454 | | | | ILL$E454 | PP_3 |
| 231 | .0455 | | | | ILL$E455 | PP_3 |
| 232 | .0456 | | | | ILL$E456 | PP_3 |
| 233 | .0457 | | | | ILL$E457 | PP_3 |
| 234 | .0460 | | | | ILL$E460 | PP_3 |
| 235 | .0461 | | | | ILL$E461 | PP_3 |
| 236 | .0462 | | | | ILL$E462 | PP_3 |
| 237 | .0463 | | | | ILL$E463 | PP_3 |
| 238 | .0464 | | | | ILL$E464 | PP_3 |
| 239 | .0465 | | | | ILL$E465 | PP_3 |
| 240 | .0466 | | | | ILL$E466 | PP_3 |
| 241 | .0467 | | | | ILL$E467 | PP_3 |
| 242 | .0470 | | | | ILL$E470 | ILLEGAL |
| 243 | .0471 | | | | ILL$E471 | ILLEGAL |
| 244 | .0472 | | | | ILL$E472 | ILLEGAL |
| 245 | .0473 | | | | ILL$E473 | ILLEGAL |
| 246 | .0474 | | | | ILL$E474 | ILLEGAL |
| 247 | .0475 | | | | ILL$E475 | ILLEGAL |
| 248 | .0476 | | | | ILL$E476 | ILLEGAL |
| 249 | .0477 | | | | ILL$E477 | ILLEGAL |
| 250 | .0500 | 07 | 16 | 00 | LOCL$E | PP_3 |
| 251 | .0513 | 07 | 16 | 13 | CALL$E | PP_3 |
| 252 | .0520 | 07 | 17 | 00 | GOTO$E | PP_3 |
| 253 | .0560 | 07 | 00 | | ADE$E | PP_3 |
| 254 | .0561 | 07 | 01 | | DADE$E | PP_3 |
| 255 | .0562 | 07 | 02 | | SDE$E | PP_3 |
| 256 | .0563 | 07 | 03 | | DSDE$E | PP_3 |
| 257 | .0564 | 07 | 04 | | LAQW$E | PP_3 |
| 258 | .0565 | 07 | 05 | | SAQW$E | PP_3 |
| 259 | .0566 | 07 | 06 | | DEI$E | PP_3 |
| 260 | .0567 | 07 | 07 | | DDEI$E | PP_3 |
| 261 | .0570 | 07 | 10 | | IDE$E | PP_3 |
| 262 | .0571 | 07 | 11 | | DIDE$E | PP_3 |
| 263 | .0572 | 07 | 12 | | ILL$E572 | ILLEGAL |
| 264 | .0573 | 07 | 13 | | ILL$E573 | ILLEGAL |
| 265 | .0574 | 07 | 14 | | LPD$E | ILLEGAL |
| 266 | .0575 | 07 | 15 | | ILL$E575 | ILLEGAL |
| 267 | .0600 | 50 | | 00 | TNOP$E | PP_3 |
| 268 | .0601 | 50 | | 01 | TGZ$E | PP_3 |
| 269 | .0602 | 50 | | 02 | TPZ$E | PP_3 |
| 270 | .0603 | 50 | | 03 | TP$E | PP_3 |

FIG. 12-F

|  | ENCODED VECTOR | OP-CODES F | J | A | MNEMONIC | PROCESSOR PRIVILAGE |
|---|---|---|---|---|---|---|
| 271 | .0604 | 50 |  | 04 | TMZ$E | PP_3 |
| 272 | .0605 | 50 |  | 05 | TMZG$E | PP_3 |
| 273 | .0606 | 50 |  | 06 | TZ$E | PP_3 |
| 274 | .0607 | 50 |  | 07 | TNLZ$E | PP_3 |
| 275 | .0610 | 50 |  | 10 | TLZ$E | PP_3 |
| 276 | .0611 | 50 |  | 11 | TNZ$E | PP_3 |
| 277 | .0612 | 50 |  | 12 | TPZL$E | PP_3 |
| 278 | .0613 | 50 |  | 13 | TNMZ$E | PP_3 |
| 279 | .0614 | 50 |  | 14 | TN$E | PP_3 |
| 280 | .0615 | 50 |  | 15 | TNPZ$E | PP_3 |
| 281 | .0616 | 50 |  | 16 | TNGZ$E | PP_3 |
| 282 | .0617 | 50 |  | 17 | TSKP$E | PP_3 |
| 283 | .0620 | 71 | 00 |  | MTE$E | PP_3 |
| 284 | .0621 | 71 | 01 |  | MTNE$E | PP_3 |
| 285 | .0622 | 71 | 02 |  | MTLE$E | PP_3 |
| 286 | .0623 | 71 | 03 |  | MTG$E | PP_3 |
| 287 | .0624 | 71 | 04 |  | MTW$E | PP_3 |
| 288 | .0625 | 71 | 05 |  | MTNW$E | PP_3 |
| 289 | .0626 | 71 | 06 |  | MATL$E | PP_3 |
| 290 | .0627 | 71 | 07 |  | MATG$E | PP_3 |
| 291 | .0630 | 71 | 10 |  | DA$E | PP_3 |
| 292 | .0631 | 71 | 11 |  | DAN$E | PP_3 |
| 293 | .0632 | 71 | 12 |  | DS$E | PP_3 |
| 294 | .0633 | 71 | 13 |  | DL$E | PP_3 |
| 295 | .0634 | 71 | 14 |  | DLN$E | PP_3 |
| 296 | .0635 | 71 | 15 |  | DLM$E | PP_3 |
| 297 | .0636 | 71 | 16 |  | DJZ$E | PP_3 |
| 298 | .0637 | 71 | 17 |  | DTE$E | PP_3 |
| 299 | .0640 | 72 | 00 |  | ILL$E640 | ILLEGAL |
| 300 | .0641 | 72 | 01 |  | ILL$E641 | ILLEGAL |
| 301 | .0642 | 72 | 02 |  | JPS$E | PP_3 |
| 302 | .0643 | 72 | 03 |  | JNS$E | PP_3 |
| 303 | .0644 | 72 | 04 |  | AH$E | PP_3 |
| 304 | .0645 | 72 | 05 |  | ANH$E | PP_3 |
| 305 | .0646 | 72 | 06 |  | AT$E | PP_3 |
| 306 | .0647 | 72 | 07 |  | ANT$E | PP_3 |
| 307 | .0650 | 72 | 10 |  | BDE$E | PP_3 |
| 308 | .0651 | 72 | 11 |  | DEB$E | PP_3 |
| 309 | .0652 | 72 | 12 |  | BN$E | PP_3 |
| 310 | .0653 | 72 | 13 |  | ILL$E653 | PP_3 |
| 311 | .0654 | 72 | 14 |  | BBN$E | PP_3 |
| 312 | .0655 | 72 | 15 |  | TRA$E | PP_3 |
| 313 | .0656 | 72 | 16 |  | SRS$E | PP_3 |
| 314 | .0657 | 72 | 17 |  | LRS$E | PP_3 |
| 315 | .0660 | 73 | 00 |  | SSC$E | PP_3 |

FIG. 12-G

|  | ENCODED VECTOR | OP-CODES F | J | A | MNEMONIC | PROCESSOR PRIVILAGE |
|---|---|---|---|---|---|---|
| 316 | .0661 | 73 | 01 |  | DSC$E | PP_3 |
| 317 | .0662 | 73 | 02 |  | SSL$E | PP_3 |
| 318 | .0663 | 73 | 03 |  | DSL$E | PP_3 |
| 319 | .0664 | 73 | 04 |  | SSA$E | PP_3 |
| 320 | .0665 | 73 | 05 |  | DSA$E | PP_3 |
| 321 | .0666 | 73 | 06 |  | LSC$E | PP_3 |
| 322 | .0667 | 73 | 07 |  | DLSC$E | PP_3 |
| 323 | .0670 | 73 | 10 |  | LSSC$E | PP_3 |
| 324 | .0671 | 73 | 11 |  | LDSC$E | PP_3 |
| 325 | .0672 | 73 | 12 |  | LSSL$E | PP_3 |
| 326 | .0673 | 73 | 13 |  | LDSL$E | PP_3 |
| 327 | .0676 | 73 | 16 |  | EDDE$E | PP_3 |
| 328 | .0700 | 74 | 00 |  | JZ$E | PP_3 |
| 329 | .0701 | 74 | 01 |  | JNZ$E | PP_3 |
| 330 | .0702 | 74 | 02 |  | JP$E | PP_3 |
| 331 | .0703 | 74 | 03 |  | JN$E | PP_3 |
| 332 | .0704 | 74 | 04 |  | ILL$E704 | PP_3 |
| 333 | .0705 | 74 | 05 |  | ILL$E705 | PP_3 |
| 334 | .0706 | 74 | 06 |  | ILL$E706 | PP_3 |
| 335 | .0707 | 74 | 07 |  | ILL$E707 | PP_3 |
| 336 | .0710 | 74 | 10 |  | JNB$E | PP_3 |
| 337 | .0711 | 74 | 11 |  | JB$E | PP_3 |
| 338 | .0712 | 74 | 12 |  | JMGI$E | PP_3 |
| 339 | .0713 | 74 | 13 |  | LMJ$E | PP_3 |
| 340 | .0716 | 74 | 16 |  | ILL$E716 | PP_3 |
| 341 | .0717 | 74 | 17 |  | ILL$E717 | PP_3 |
| 342 | .0720 | 75 | 00 |  | LBU$E | PP_3 |
| 343 | .0721 | 75 | 01 |  | ILL$LBUI | PP_3 |
| 344 | .0722 | 75 | 02 |  | SBU$E | PP_3 |
| 345 | .0723 | 75 | 03 |  | LBE$E | PP_0 |
| 346 | .0724 | 75 | 04 |  | SBED$E | PP_0 |
| 347 | .0725 | 75 | 05 |  | LBED$E | PP_0 |
| 348 | .0726 | 75 | 06 |  | SBUD$E | PP_0 |
| 349 | .0727 | 75 | 07 |  | LBUD$E | PP_0 |
| 350 | .0730 | 75 | 10 |  | TVA$E | PP_3 |
| 351 | .0731 | 75 | 11 |  | ILL$ETVAE | PP_3 |
| 352 | .0732 | 75 | 12 |  | ILL$E732 | PP_3 |
| 353 | .0733 | 75 | 13 |  | LXLM$E | PP_3 |
| 354 | .0734 | 75 | 14 |  | LBN$E | PP_3 |
| 355 | .0735 | 75 | 15 |  | CR$E | PP_3 |
| 356 | .0736 | 75 | 16 |  | RMC$E | PP_0 |
| 357 | .0737 | 75 | 17 |  | RMD$E | PP_2 |
| 358 | .0740 | 76 | 00 |  | FA$E | PP_3 |
| 359 | .0741 |  | 01 |  | FAN$E | PP_3 |
| 360 | .0742 |  | 02 |  | FM$E | PP_3 |

FIG. 12-H

| | ENCODED VECTOR | OP-CODES F | J | A | MNEMONIC | PROCESSOR PRIVILAGE |
|---|---|---|---|---|---|---|
| 361 | .0743 | 03 | | | FD$E | PP_3 |
| 362 | .0744 | 04 | | | LUF$E | PP_3 |
| 363 | .0745 | 05 | | | LCF$E | PP_3 |
| 364 | .0746 | 06 | | | MCDU$E | PP_3 |
| 365 | .0747 | 07 | | | CDU$E | PP_3 |
| 366 | .0750 | 10 | | | DFA$E | PP_3 |
| 367 | .0751 | 11 | | | DFAN$E | PP_3 |
| 368 | .0752 | 12 | | | DFM$E | PP_3 |
| 369 | .0753 | 13 | | | DFD$E | PP_3 |
| 370 | .0754 | 14 | | | DFU$E | PP_3 |
| 371 | .0755 | 15 | | | DLCF$E | PP_3 |
| 372 | .0756 | 16 | | | FEL$E | PP_3 |
| 373 | .0757 | 76 | 17 | | FCL$E | PP_3 |
| 374 | .1000 | 00 | | | ILL$B000 | PP_3 |
| 375 | .1001 | 01 | | | SA$B | PP_3 |
| 376 | .1002 | 02 | | | SNA$B | PP_3 |
| 377 | .1003 | 03 | | | SMA$B | PP_3 |
| 378 | .1004 | 04 | | | SR$B | PP_3 |
| 379 | .1006 | 06 | | | SX$B | PP_3 |
| 380 | .1010 | 10 | | | LA$B | PP_3 |
| 381 | .1011 | 11 | | | LNA$B | PP_3 |
| 382 | .1012 | 12 | | | LMA$B | PP_3 |
| 383 | .1013 | 13 | | | LNMA$B | PP_3 |
| 384 | .1014 | 14 | | | AA$B | PP_3 |
| 385 | .1015 | 15 | | | ANA$B | PP_3 |
| 386 | .1016 | 16 | | | AMA$B | PP_3 |
| 387 | .1017 | 17 | | | ANMA$B | PP_3 |
| 388 | .1020 | 20 | | | AU$B | PP_3 |
| 389 | .1021 | 21 | | | ANU$B | PP_3 |
| 390 | .1022 | 22 | | | BT$B | PP_3 |
| 391 | .1023 | 23 | | | LR$B | PP_3 |
| 392 | .1024 | 24 | | | AX$B | PP_3 |
| 393 | .1025 | 25 | | | ANX$B | PP_3 |
| 394 | .1026 | 26 | | | LXM$B | PP_3 |
| 395 | .1027 | 27 | | | LX$B | PP_3 |
| 396 | .1030 | 30 | | | MI$B | PP_3 |
| 397 | .1031 | 31 | | | MSI$B | PP_3 |
| 398 | .1032 | 32 | | | MF$B | PP_3 |
| 399 | .1034 | 34 | | | DI$B | PP_3 |
| 400 | .1035 | 35 | | | DSF$B | PP_3 |
| 401 | .1036 | 36 | | | DF$B | PP_3 |
| 402 | .1040 | 40 | | | OR$B | PP_3 |
| 403 | .1041 | 41 | | | XOR$B | PP_3 |
| 404 | .1042 | 42 | | | AND$B | PP_3 |
| 405 | .1043 | 43 | | | MLU$B | PP_3 |

FIG. 12-I

|  | ENCODED VECTOR | OP-CODES F | J | A | MNEMONIC | PROCESSOR PRIVILAGE |
|---|---|---|---|---|---|---|
| 406 | .1044 | 44 |  |  | TEP$B | PP_3 |
| 407 | .1045 | 45 |  |  | TOP$B | PP_3 |
| 408 | .1046 | 46 |  |  | LXI$B | PP_3 |
| 409 | .1047 | 47 |  |  | TLEM$B | PP_3 |
| 410 | .1050 | 50 |  |  | TZ$B | PP_3 |
| 411 | .1051 | 51 |  |  | TNZ$B | PP_3 |
| 412 | .1052 | 52 |  |  | TE$B | PP_3 |
| 413 | .1053 | 53 |  |  | TNE$B | PP_3 |
| 414 | .1054 | 54 |  |  | TLE$B | PP_3 |
| 415 | .1055 | 55 |  |  | TG$B | PP_3 |
| 416 | .1056 | 56 |  |  | TW$B | PP_3 |
| 417 | .1057 | 57 |  |  | TNW$B | PP_3 |
| 418 | .1060 | 60 |  |  | TP$B | PP_3 |
| 419 | .1061 | 61 |  |  | TN$B | PP_3 |
| 420 | .1062 | 62 |  |  | SE$B | PP_3 |
| 421 | .1063 | 63 |  |  | SNE$B | PP_3 |
| 422 | .1064 | 64 |  |  | SLE$B | PP_3 |
| 423 | .1065 | 65 |  |  | SG$B | PP_3 |
| 424 | .1066 | 66 |  |  | SW$B | PP_3 |
| 425 | .1067 | 67 |  |  | SNW$B | PP_3 |
| 426 | .1070 | 70 |  |  | JGD$B | PP_3 |
| 427 | .1077 | 77 |  |  | ILL$B077 | PP_3 |
| 428 | .1100 | 73 | 14 | 00 | ILL$B100 | PP_3 |
| 429 | .1101 | 73 | 14 | 01 | LPM$B | PP_3 |
| 430 | .1102 | 73 | 14 | 02 | BUY$B | PP_3 |
| 431 | .1103 | 73 | 14 | 03 | SELL$B | PP_3 |
| 432 | .1104 | 73 | 14 | 04 | ILL$B104 | PP_3 |
| 433 | .1105 | 73 | 14 | 05 | ILL$B105 | PP_3 |
| 434 | .1106 | 73 | 14 | 06 | ILL$B106 | PP_3 |
| 435 | .1107 | 73 | 14 | 07 | ILL$B107 | PP_3 |
| 436 | .1110 | 73 | 14 | 10 | IL$B110 | PP_3 |
| 437 | .1111 | 73 | 14 | 11 | ILL$B111 | PP_3 |
| 438 | .1112 | 73 | 14 | 12 | ILL$B112 | PP_3 |
| 439 | .1113 | 73 | 14 | 13 | ILL$B113 | PP_3 |
| 440 | .1114 | 73 | 14 | 14 | LINC$B | PP_3 |
| 441 | .1115 | 73 | 14 | 15 | SINC$B | PP_3 |
| 442 | .1116 | 73 | 14 | 16 | ILL$B116 | PP_3 |
| 443 | .1117 | 73 | 14 | 17 | ILL$B117 | PP_3 |
| 444 | .1120 | 73 | 15 | 00 | ILL$B120 | PP_3 |
| 445 | .1121 | 73 | 15 | 01 | ILL$B121 | PP_3 |
| 446 | .1122 | 73 | 15 | 02 | LBRX$B | PP_3 |
| 447 | .1123 | 73 | 15 | 03 | ACEL$B | PP_2 |
| 448 | .1124 | 73 | 15 | 04 | DCEL$B | PP_2 |
| 449 | .1125 | 73 | 15 | 05 | SPID$B | PP_2 |
| 450 | .1126 | 73 | 15 | 06 | ILL$BVABT | PP_3 |

FIG. 12-J

| ENCODED VECTOR | OP-CODES F | J | A | MNEMONIC | PROCESSOR PRIVILAGE |
|---|---|---|---|---|---|
| 451 | .1127 | 73 | 15 | 07 | SEND$B | PP_0 |
| 452 | .1130 | 73 | 15 | 10 | ACK$B | PP_0 |
| 453 | .1131 | 73 | 15 | 11 | ILL$B131 | PP_3 |
| 454 | .1132 | 73 | 15 | 12 | LAE$B | PP_3 |
| 455 | .1133 | 73 | 15 | 13 | SKQT$B | PP_3 |
| 456 | .1134 | 73 | 15 | 14 | LD$B | PP_0 |
| 457 | .1135 | 73 | 15 | 15 | SD$B | PP_1 |
| 458 | .1136 | 73 | 15 | 16 | UR$B | PP_0 |
| 459 | .1137 | 73 | 15 | 17 | SGNL$B | PP_3 |
| 460 | .1140 | 05 | -- | 00 | SZ$B | PP_3 |
| 461 | .1141 | 05 | -- | 01 | SNZ$B | PP_3 |
| 462 | .1142 | 05 | -- | 02 | SP1$B | PP_3 |
| 463 | .1143 | 05 | -- | 03 | SN1$B | PP_3 |
| 464 | .1144 | 05 | -- | 04 | SFS$B | PP_3 |
| 465 | .1145 | 05 | -- | 05 | SFZ$B | PP_3 |
| 466 | .1146 | 05 | -- | 06 | SAS$B | PP_3 |
| 467 | .1147 | 05 | -- | 07 | SAZ$B | PP_3 |
| 468 | .1150 | 05 | -- | 10 | INC$B | PP_3 |
| 469 | .1151 | 05 | -- | 11 | DEC$B | PP_3 |
| 470 | .1152 | 05 | -- | 12 | INC2$B | PP_3 |
| 471 | .1153 | 05 | -- | 13 | DEC2$B | PP_3 |
| 472 | .1154 | 05 | -- | 14 | ENZ$B | PP_3 |
| 473 | .1155 | 05 | -- | 15 | ADD1$B | PP_0 |
| 474 | .1156 | 05 | -- | 16 | SUB1$B | PP_0 |
| 475 | .1157 | 05 | -- | 17 | ILL$B157 | PP_3 |
| 476 | .1160 | 73 | 17 | 00 | TS$B | PP_3 |
| 477 | .1161 | 73 | 17 | 01 | TSS$B | PP_3 |
| 478 | .1162 | 73 | 17 | 02 | TCS$B | PP_3 |
| 479 | .1163 | 73 | 17 | 03 | ILL$B163 | PP_3 |
| 480 | .1164 | 73 | 17 | 04 | LUD$B | PP_3 |
| 481 | .1165 | 73 | 17 | 05 | SUD$B | PP_3 |
| 482 | .1166 | 73 | 17 | 06 | IAR$B | PP_3 |
| 483 | .1167 | 73 | 17 | 07 | ILL$B167 | PP_3 |
| 484 | .1170 | 73 | 17 | 10 | IPC$B | PP_3 |
| 485 | .1171 | 73 | 17 | 11 | ILL$B171 | PP_3 |
| 486 | .1172 | 73 | 17 | 12 | SYSC$B | PP_3 |
| 487 | .1175 | 73 | 17 | 15 | LATP$B | PP_3 |
| 488 | .1176 | 73 | 17 | 16 | INV$B | PP_3 |
| 489 | .1177 | 73 | 17 | 17 | SJH$B | PP_3 |
| 490 | .1200 | 74 | 04 | 00 | J$B | PP_3 |
| 491 | .1201 | 74 | 04 | 01 | JK$B | PP_3 |
| 492 | .1220 | 74 | 05 | 00 | HJ$B | PP_3 |
| 493 | .1221 | 74 | 05 | 01 | HKJ$B | PP_3 |
| 494 | .1222 | 74 | 05 | 02 | HKJ$B | PP_3 |
| 495 | .1223 | 74 | 05 | 03 | HJK$B | PP_3 |

FIG. 12-K

|  | ENCODED VECTOR | OP-CODES F | J | A | MNEMONIC | PROCESSOR PRIVILAGE |
|---|---|---|---|---|---|---|
| 496 | .1224 | 74 | 05 | 04 | HKJ$B | PP_3 |
| 497 | .1225 | 74 | 05 | 05 | HKJ$B | PP_3 |
| 498 | .1226 | 74 | 05 | 06 | HKJ$B | PP_3 |
| 499 | .1227 | 74 | 05 | 07 | HKJ$B | PP_3 |
| 500 | .1230 | 74 | 05 | 10 | HJK$B | PP_3 |
| 501 | .1231 | 74 | 05 | 11 | HKJ$B | PP_3 |
| 502 | .1232 | 74 | 05 | 12 | HJK$B | PP_3 |
| 503 | .1233 | 74 | 05 | 13 | HJK$B | PP_3 |
| 504 | .1234 | 74 | 05 | 14 | HJK$B | PP_3 |
| 505 | .1235 | 74 | 05 | 15 | HJK$B | PP_3 |
| 506 | .1236 | 74 | 05 | 16 | HKJ$B | PP_3 |
| 507 | .1237 | 74 | 05 | 17 | HKJ$B | PP_3 |
| 508 | .1240 | 74 | 14 | 00 | JO$B | PP_3 |
| 509 | .1241 | 74 | 14 | 01 | JFU$B | PP_3 |
| 510 | .1242 | 74 | 14 | 02 | JFO$B | PP_3 |
| 511 | .1243 | 74 | 14 | 03 | JDF$B | PP_3 |
| 512 | .1244 | 74 | 14 | 04 | ILL$B244 | PP_3 |
| 513 | .1245 | 74 | 14 | 05 | ILL$B245 | PP_3 |
| 514 | .1246 | 74 | 14 | 06 | ILL$B246 | PP_3 |
| 515 | .1247 | 74 | 14 | 07 | PAIJ$B | PP_0 |
| 516 | .1250 | 74 | 14 | 10 | ILL$B250 | PP_3 |
| 517 | .1251 | 74 | 14 | 11 | ILL$B251 | PP_3 |
| 518 | .1252 | 74 | 14 | 12 | ILL$B252 | PP_3 |
| 519 | .1253 | 74 | 14 | 13 | ILL$B253 | PP_3 |
| 520 | .1254 | 74 | 14 | 14 | ILL$B254 | PP_3 |
| 521 | .1255 | 74 | 14 | 15 | ILL$B255 | PP_3 |
| 522 | .1256 | 74 | 14 | 16 | ILL$B256 | PP_3 |
| 523 | .1257 | 74 | 14 | 17 | ILL$B257 | PP_3 |
| 524 | .1260 | 74 | 15 | 00 | JNO$B | PP_3 |
| 525 | .1261 | 74 | 15 | 01 | JNFU$B | PP_3 |
| 526 | .1262 | 74 | 15 | 02 | JNFO$B | PP_3 |
| 527 | .1263 | 74 | 15 | 03 | JNDF$B | PP_3 |
| 528 | .1264 | 74 | 15 | 04 | ILL$B264 | PP_3 |
| 529 | .1265 | 74 | 15 | 05 | HLTJ$B | PP_3 |
| 530 | .1266 | 74 | 15 | 06 | ILL$B266 | PP_3 |
| 531 | .1267 | 74 | 15 | 07 | ILL$B267 | PP_3 |
| 532 | .1270 | 74 | 15 | 10 | ILL$B270 | PP_3 |
| 533 | .1271 | 74 | 15 | 11 | ILL$B271 | PP_3 |
| 534 | .1272 | 74 | 15 | 12 | ILL$B272 | PP_3 |
| 535 | .1273 | 74 | 15 | 13 | ILL$B273 | PP_3 |
| 536 | .1274 | 74 | 15 | 14 | ILL$B274 | PP_3 |
| 537 | .1275 | 74 | 15 | 15 | ILL$B275 | PP_3 |
| 538 | .1276 | 74 | 15 | 16 | ILL$B276 | PP_3 |
| 539 | .1277 | 74 | 15 | 17 | ILL$B277 | PP_3 |
| 540 | .1335 | 33 | 15 |  | DCB$B | PP_3 |

FIG. 12-L

|  | ENCODED VECTOR | OP-CODES F | J | A | MNEMONIC | PROCESSOR PRIVILAGE |
|---|---|---|---|---|---|---|
| 541 | .1340 | 37 | 06 | 00 | SLP0$B | PP_3 |
| 542 | .1341 | 37 | 06 | 01 | SLP1$B | PP_3 |
| 543 | .1360 | 37 | 00 |  | LRD$B | PP_3 |
| 544 | .1361 | 37 | 01 |  | RRD$B | PP_3 |
| 545 | .1362 | 37 | 02 |  | LRC$B | PP_3 |
| 546 | .1363 | 37 | 03 |  | RRC$B | PP_3 |
| 547 | .1367 | 37 | 07 |  | LMC$B | PP_0 |
| 548 | .1370 | 37 | 10 |  | BIM$B | PP_3 |
| 549 | .1371 | 37 | 11 |  | BIC$B | PP_3 |
| 550 | .1372 | 37 | 12 |  | BIMT$B | PP_3 |
| 551 | .1373 | 37 | 13 |  | BICL$B | PP_3 |
| 552 | .1374 | 37 | 14 |  | BIML$B | PP_3 |
| 553 | .1375 | 37 | 15 |  | BDE$B | PP_3 |
| 554 | .1376 | 37 | 16 |  | DEB$B | PP_3 |
| 555 | .1377 | 37 | 17 |  | EDDE$B | PP_3 |
| 556 | .1400 | 05 |  | 16-17 | NOP5$B | PP_3 |
| 557 | .1401 | 01 |  | 16-17 | PRBA$B | PP_3 |
| 558 | .1402 | 02 |  | 16-17 | SIMX$B | PP_3 |
| 559 | .1403 | 03 |  | 16-17 | PRBC$B | PP_3 |
| 560 | .1404 | 04 |  | 16-17 | NOP4$B | PP_3 |
| 561 | .1521 | 07 | 17 | 01 | LBJ$B01 | PP_3 |
| 562 | .1522 | 07 | 17 | 02 | LBJ$B02 | PP_3 |
| 563 | .1523 | 07 | 17 | 03 | LBJ$B03 | PP_3 |
| 564 | .1524 | 07 | 17 | 04 | LBJ$B04 | PP_3 |
| 565 | .1525 | 07 | 17 | 05 | LBJ$B05 | PP_3 |
| 566 | .1526 | 07 | 17 | 06 | LBJ$B06 | PP_3 |
| 567 | .1527 | 07 | 17 | 07 | LBJ$B07 | PP_3 |
| 568 | .1530 | 07 | 17 | 10 | LBJ$B10 | PP_3 |
| 569 | .1531 | 07 | 17 | 11 | LBJ$B11 | PP_3 |
| 570 | .1532 | 07 | 17 | 12 | LBJ$B12 | PP_3 |
| 571 | .1533 | 07 | 17 | 13 | LBJ$B13 | PP_3 |
| 572 | .1534 | 07 | 17 | 14 | LBJ$B14 | PP_3 |
| 573 | .1535 | 07 | 17 | 15 | LBJ$B15 | PP_3 |
| 574 | .1536 | 07 | 17 | 16 | LBJ$B16 | PP_3 |
| 575 | .1537 | 07 | 17 | 17 | LBJ$B17 | PP_3 |
| 576 | .1560 | 07 | 00 |  | ADE$B | PP_3 |
| 577 | .1561 | 07 | 01 |  | DADE$B | PP_3 |
| 578 | .1562 | 07 | 02 |  | SDE$B | PP_3 |
| 579 | .1563 | 07 | 03 |  | DSDE$B | PP_3 |
| 580 | .1564 | 07 | 04 |  | LAQW$B | PP_3 |
| 581 | .1565 | 07 | 05 |  | SAQW$B | PP_3 |
| 582 | .1566 | 07 | 06 |  | DEI$B | PP_3 |
| 583 | .1567 | 07 | 07 |  | DDEI$B | PP_3 |
| 584 | .1570 | 07 | 10 |  | IDE$B | PP_3 |
| 585 | .1571 | 07 | 11 |  | DIDE$B | PP_3 |

FIG. 12-M

| ENCODED VECTOR | OP-CODES F | J | A | MNEMONIC | PROCESSOR PRIVILAGE |
|---|---|---|---|---|---|
| 586 | .1572 | 07 | 12 | LDJ$B | PP_3 |
| 587 | .1573 | 07 | 13 | LIJ$B | PP_3 |
| 588 | .1574 | 07 | 14 | LPD$B | PP_3 |
| 589` | .1575 | 07 | 15 | SPD$B | PP_3 |
| 590 | .1620 | 71 | 00 | MSE$B | PP_3 |
| 591 | .1621 | 71 | 01 | MSNE$B | PP_3 |
| 592 | .1622 | 71 | 02 | MSLE$B | PP_3 |
| 593 | .1623 | 71 | 03 | MSG$B | PP_3 |
| 594 | .1624 | 71 | 04 | MSW$B | PP_3 |
| 595 | .1625 | 71 | 05 | MSNW$B | PP_3 |
| 596 | .1626 | 71 | 06 | MASL$B | PP_3 |
| 597 | .1627 | 71 | 07 | MASG$B | PP_3 |
| 598 | .1630 | 71 | 10 | DA$B | PP_3 |
| 599 | .1631 | 71 | 11 | DAN$B | PP_3 |
| 600 | .1632 | 71 | 12 | DS$B | PP_3 |
| 601 | .1633 | 71 | 13 | DL$B | PP_3 |
| 602 | .1634 | 71 | 14 | DLN$B | PP_3 |
| 603 | .1635 | 71 | 15 | DLM$B | PP_3 |
| 604 | .1636 | 71 | 16 | DJZ$B | PP_3 |
| 605 | .1637 | 71 | 17 | DTE$B | PP_3 |
| 606 | .1640 | 72 | 00 | ILL%B640 | PP_3 |
| 607 | .1641 | 72 | 01 | SLJ$B | PP_3 |
| 608 | .1642 | 72 | 02 | JPS$B | PP_3 |
| 609 | .1643 | 72 | 03 | JNS$B | PP_3 |
| 610 | .1644 | 72 | 04 | AH$B | PP_3 |
| 611 | .1645 | 72 | 05 | ANH$B | PP_3 |
| 612 | .1646 | 72 | 06 | AT$B | PP_3 |
| 613 | .1647 | 72 | 07 | ANT$B | PP_3 |
| 614 | .1650 | 72 | 10 | EX$B | PP_3 |
| 615 | .1651 | 72 | 11 | ER$B | PP_3 |
| 616 | .1652 | 72 | 12 | BN$B | PP_3 |
| 617 | .1653 | 72 | 13 | ILL$B653 | PP_3 |
| 618 | .1654 | 72 | 14 | BBN$B | PP_3 |
| 619 | .1655 | 72 | 15 | TRA$B | PP_3 |
| 620 | .1656 | 72 | 16 | SRS$B | PP_3 |
| 621 | .1657 | 72 | 17 | LRS$B | PP_3 |
| 622 | .1660 | 73 | 00 | SSC$B | PP_3 |
| 623 | .1661 | 73 | 01 | DSC$B | PP_3 |
| 624 | .1662 | 73 | 02 | SSL$B | PP_3 |
| 625 | .1663 | 73 | 03 | DSL$B | PP_3 |
| 626 | .1664 | 73 | 04 | SSA$B | PP_3 |
| 627 | .1665 | 73 | 05 | DSA$B | PP_3 |
| 628 | .1666 | 73 | 06 | LSC$B | PP_3 |
| 629 | .1667 | 73 | 07 | DLSC$B | PP_3 |
| 630 | .1670 | 73 | 10 | LSSC$B | PP_3 |

FIG. 12-N

|  | ENCODED VECTOR | OP-CODES F | J | A | MNEMONIC | PROCESSOR PRIVILAGE |
|---|---|---|---|---|---|---|
| 631 | .1671 | 73 | 11 |  | LDSC$B | PP_3 |
| 632 | .1672 | 73 | 12 |  | LSSL$B | PP_3 |
| 633 | .1673 | 73 | 13 |  | LDSL$B | PP_3 |
| 634 | .1676 | 73 | 16 |  | ILL$B676 | PP_3 |
| 635 | .1700 | 74 | 00 |  | JZ$B | PP_3 |
| 636 | .1701 | 74 | 01 |  | JNZ$B | PP_3 |
| 637 | .1702 | 74 | 02 |  | JP$B | PP_3 |
| 638 | .1703 | 74 | 03 |  | JN$B | PP_3 |
| 639 | .1706 | 74 | 06 |  | NOP$B | PP_3 |
| 640 | .1707 | 74 | 07 |  | AAIJ$B | PP_3 |
| 641 | .1710 | 74 | 10 |  | JNB$B | PP_3 |
| 642 | .1711 | 74 | 11 |  | JS$B | PP_3 |
| 643 | .1712 | 74 | 12 |  | JMGI$B | PP_3 |
| 644 | .1713 | 74 | 13 |  | LMJ$B | PP_3 |
| 645 | .1716 | 74 | 16 |  | JC$B | PP_3 |
| 646 | .1717 | 74 | 17 |  | JNC$B | PP_3 |
| 647 | .1720 | 75 | 00 |  | LBU$B | PP_0 |
| 648 | .1722 | 75 | 02 |  | SBU$B | PP_0 |
| 649 | .1723 | 75 | 03 |  | LBE$B | PP_0 |
| 650 | .1724 | 75 | 04 |  | SBED$B | PP_0 |
| 651 | 1725 | 75 | 05 |  | LBED$B | PP_0 |
| 652 | .1726 | 75 | 06 |  | SBUD$B | PP_0 |
| 653 | .1727 | 75 | 07 |  | LBUD$B | PP_0 |
| 654 | .1730 | 75 | 10 |  | TVA$B | PP_0 |
| 655 | .1731 | 75 | 11 |  | ILL$BTVAE | PP_3 |
| 656 | .1732 | 75 | 12 |  | ILL$B732 | PP_3 |
| 657 | .1733 | 75 | 13 |  | LXLM$B | PP_3 |
| 658 | .1734 | 75 | 14 |  | LBN$B | PP_0 |
| 659 | .1735 | 75 | 15 |  | CR$B | PP_3 |
| 660 | .1736 | 75 | 16 |  | RMC$B | PP_0 |
| 661 | .1737 | 75 | 17 |  | RMD$B | PP_2 |
| 662 | .1740 | 76 | 00 |  | FA$B | PP_3 |
| 663 | .1741 | 76 | 01 |  | FAN$B | PP_3 |
| 664 | .1742 | 76 | 02 |  | FM$B | PP_3 |
| 665 | .1743 | 76 | 03 |  | FD$B | PP_3 |
| 666 | .1744 | 76 | 04 |  | LUF$B | PP_3 |
| 667 | .1745 | 76 | 05 |  | LCF$B | PP_3 |
| 668 | .1746 | 76 | 06 |  | MCDU$B | PP_3 |
| 669 | .1747 | 76 | 07 |  | CDU$B | PP_3 |
| 670 | .1750 | 76 | 10 |  | DFA$B | PP_3 |
| 671 | .1751 | 76 | 11 |  | DFAN$B | PP_3 |
| 672 | .1752 | 76 | 12 |  | DFM$B | PP_3 |
| 673 | .1753 | 76 | 13 |  | DFD$B | PP_3 |
| 674 | .1754 | 76 | 14 |  | DFU$B | PP_3 |
| 675 | .1755 | 76 | 15 |  | DLCF$B | PP_3 |
| 676 | .1756 | 76 | 16 |  | FEL$B | PP_3 |
| 677 | .1757 | 76 | 17 |  | FCL$B | PP_3 |

FIG. 12-O

INSTRUCTION PROCESSOR CONTROL SYSTEM USING SEPARATE HARDWARE AND MICROCODE CONTROL SIGNALS TO CONTROL THE PIPELINED EXECUTION OF MULTIPLE CLASSES OF MACHINE INSTRUCTIONS

This is a continuation of application Ser. No. 07/762,282 filed on Sep. 19, 1991, now abandoned.

CROSS REFERENCE TO CO-PENDING APPLICATIONS

The present application is related to co-pending U.S. patent application Ser. No. 07/762,276, filed Sep. 19, 1991, entitled Data Coherency Protocol For Multi-Level Cached High Performance Multiprocessor System, assigned to the assignee of the present invention and incorporated herein by reference, now abandoned.

BACKGROUND OF THE INVENTION

A. Field of the Invention

This invention relates to an improved control system for controlling the pipelined execution of different types of instructions in a digital data processing system. More particularly, it relates to a control system providing dual pipeline control consisting of hardware generated control signals for execution of standard machine instructions and microcode generated control signals for execution of complex or extended cycle machine instructions. Still more particularly, an additional feature of the invention provides a second microcode controller for localized control of the execution of certain decimal instructions within the pipelined instruction execution system.

B. State of the Prior Art

In many prior art general purpose computers, instructions are executed in a sequential manner from one instruction to the next, unless the instruction flow is modified by a branch condition or otherwise. In general, the operations performed to execute the instruction after it is fetched from storage can be described functional as follows:

1. Decode the instruction and generate the address of any operands required by the instruction;

2. Fetch the operands from memory if so specified; and

3. Perform the operation defined by the instruction and store the results in memory.

A primary goal in designing computer architecture is to increase the speed at which instructions may be executed. One commonly used technique to increase speed is pipelining of instructions. Pipeline execution is much like assembly of an item in assembly line operation where various required operations are performed at different stages and locations as the item moves down the assembly line. Pipelined instructions enter and exit the pipeline at intervals that are shorter than the time it takes to process a single instruction. This is accomplished by dividing the process of instruction execution into stages which correspond to the different functional operations which must be performed. Typically, these functional operations are divided so that each may be completed within one timing cycle of the system. In that case the pipeline stages correspond directly to the system timing cycles such that one pipeline stage is completed every timing cycle. Each of the functional operations are processed by a different stage of the pipeline. It may be considered that the instruction "travels" from one stage of the pipeline to the next at fixed times. Each stage of the pipeline performs part of the instruction execution. For example, the data processing system of this invention utilizes a three stage pipeline divided into the functional stages set forth above. In fully pipelined operation, instructions are overlapped such that each stage of the pipeline is processing a separate instruction at the same time. Even though each instruction requires three stages to process, because of overlapped operation, one instruction completes every stage. Therefore, it is evident that proper operational control of the instruction execution pipeline is essential to the optimal operation of the system.

Two types of control systems are generally known and used. These are hardwired logic control systems (hardware) and microcode control systems. Each type offers both advantages and disadvantages. Hardware controlled systems utilize combinatorial logic circuitry and some state registers to decode machine instructions in order to produce control signals. Such systems are noted for their high speed, low power consumption and minimal circuit size. They require considerable time to initially develop and perfect, and are costly to initially produce. Hardware control systems are developed for specific instruction sets and are very difficult to change or modify in order to adapt to new instructions or to enhancements of old instructions or to correct system deficiencies. Additionally, if the instruction set contains complex instructions, the amount of time involved in design and perfection of the logic circuitry increases as well as the amount of hardware which is needed.

Microcode controlled systems utilize information contained in the machine instruction to identify the starting address of a sequence of microinstructions to develop control signals to control logic used in executing the machine instructions. The microinstructions for the machine instruction execution are initially programmed and stored in a microcode program memory. Consequently, a substantial advantage of microcode controlled systems is the relative ease with which they can be initially designed and set up. Additionally, when compared to hardware controllers, microcode controllers take considerably less effort or expense to modify in order to correct system deficiencies or to adapt the system to new instructions or changes in old instructions. Unfortunately, microcode controllers are not as fast as hardware controllers and typically use more power and space. Thus, it would be advantageous to have a control system which incorporates the advantages found in both hardware and microcode control systems while at the same time eliminating, or at least minimizing, the disadvantages.

Numerous different types of control systems are known for controlling digital data processing systems. Each of these systems may be categorized as either microcode controlled systems or hardware controlled systems. These systems are continually undergoing change and modifications in order to improve their efficiency to optimize system operation. One of the methods known and used to improve the performance of microcode controlled systems is to incorporate certain hardware circuitry to generate additional control signals. For example, U.S. Pat. No. 4,761,755 to Ardini, Jr. et al., discloses a microcode controlled data processing system having instruction responsive control hardware for generating control signals used in configuring the arithmetic logic unit and for controlling data string manipulation circuitry. Similarly, U.S. Pat. No. 3,872,447 to Tessera et al, discloses a microcode controlled system having a hardwired sequencer which, in response to the same address bits used to address the microcode control store, provides additional control signals. In both of these prior art systems the additional hardware control signals are used to supplement to the primary control signals provided by microcode in order to control certain limited functional areas during instruction execution. At all times, however, instruction execution and sequencing remains under microcode control.

In contrast to these prior art control systems, the present invention provides a dual control system which functions as a hardware controller during the execution of standard instructions and as a microcode controller during the execution of complex or extended cycle instructions. In this manner the dual control system is able to provide the speed of hardware control for execution of standard instructions and the flexibility of microcode control desirable for complex or extended cycle instructions.

BRIEF DESCRIPTION OF THE INVENTION

A. OBJECTS

It is a primary object of the invention to provide an improved digital data processing system wherein control of the instruction execution pipeline is provided by hardware generated control signals for a first class of instructions and by microcode generated control signals for a second class of more complex or extended cycle instructions.

Another object of the invention is to provide an improved digital data processing system having a main microcode controller utilizing a main microcode memory for providing control signals for execution of a first class of instructions, and a second microcode controller utilizing a second microcode memory for controlling a second class of instruction execution, wherein during the execution of the second class of instruction the main microcode controller is under the control of the second microcode controller such that control of the pipeline execution of the second class of instructions is provided by control signals from the second microcode controller.

A further object of the invention is to provide an improved method of controlling the instruction execution pipeline in a digital data processing system by generating hardware control signals for control of execution of standard instructions and by generating microcode control signals for control of execution of complex or extended cycle instructions.

Still another object of the invention is to provide an improved method of controlling the instruction execution pipeline in a microcode controlled digital data processing system by allowing the main microcode controller to be controlled by a second microcode controller during the execution of a predetermined type of instruction, such that microcode control signals from the second microcode controller are utilized to control the instruction execution pipeline during the execution of the predetermined type of instruction.

The foregoing objectives and other more detailed and specific objects will become apparent and will be understood from the drawings and the description of the invention.

B. SUMMARY OF THE INVENTION

The digital data processing system in which the present invention may be utilized includes from one to four Storage Controllers (SC), each being directly connected to one or two local Instruction Processors (IP), and coupled to one or two local Input/output Complex Cabinets (ICC). The SC's, ICC's and IP's may be configured in various combinations to a maximum system configuration of four SC's, eight IP's and eight ICC's.

The control system of this invention is utilized within each IP to control the pipelined execution of machine instructions. Machine instructions can be divided into two major categories, standard instructions and complex or extended cycle instructions. A standard instruction is defined for purposes herein as an instruction which can be fully executed within three major timing cycles (major cycles) of the control system. A complex or extended cycle instruction is one which requires more than three major cycles to execute. The additional cycles required are referred to as extended cycles, hence the name extended cycle instruction.

The instruction execution pipeline is three stages deep, with each stage corresponding to a distinct major cycle. The first stage is used to decode the machine instruction and generate addresses for operands needed in execution of the machine instruction. The second stage is to utilize the operand addresses to fetch the operands from storage. The third stage is to perform the instruction operation required by the machine instruction, such as addition, subtraction, loads, jumps, and the like, and to store the results in the memory system.

The objectives of the present invention are accomplished by providing a dual control system, which actually consists of two interactive control mechanisms, a hardware controller and a microcode controller. This combination of interactive control provides the control system for executing a range of complex machine instructions having both the speed of a hardware controlled system and the flexibility of a microcode controlled system.

The hardware controller is in control at the start of each machine instruction. It responds to dynamic hardware conditions which can occur during the start of an instruction. These conditions include aborts, wait states and halt states, which can cause instruction execution to be delayed or even aborted. For standard instructions the hardware controller provides control for all pipeline stages. Standard instructions are relatively straight forward to control. The control is, however, complicated by the fact that at any one time, there are up to three instructions being processed in the pipeline because of overlapped machine instruction operation. This overlap can result in dynamic conflicts between machine instructions which must be resolved before instruction execution can proceed. The functional areas in the Instruction Processor which are controlled are:

1. Operand Cache Read/Write Controls
2. Operand Address Generations
3. Arithmetic Control Fields
4. Instruction Pipeline Sequencing
5. Initial IP Start-up Control
6. Interrupt Initiation and Reporting
7. Abort/Wait/Halt Control During execution of extended cycle instructions, the first pipeline stage is controlled by the hardware controller in the same manner as for standard instructions. For the second and all remaining stages an extended cycle instruction signal is activated as a result of decoding the machine instruction, which passes control to the microcode controller and which puts the hardware controller into a wait state. A starting microcode address is also sent to the microcode controller. Because of the physical nature of the microcode controller it can not respond quickly enough to the type of dynamic conditions which can arise during overlapped machine instruction execution or conditions which can cause machine instruction execution to be delayed or aborted. The microcode controller, however, does not need to respond to these conditions, since the overlapping of machine instruction execution in the pipeline is suspended during execution of an extended cycle instruction.

The microcode controller is a branchable, programmable controller which breaks down the execution of extended cycle instructions into tasks, each of which are controlled by a microinstruction. The tasks are set up such that each microinstruction may be executed within three major cycles of the control system, the same as for standard machine instructions. Extended cycle instructions are executed utilizing the same pipeline, but instead of the machine instructions being overlapped, as in the case of standard instructions, the microinstructions are overlapped. This control architecture allows a clear segregation of complex tasks. The hardware controller must look at all hardware conditions and dynamically create decodes and control as the three deep pipeline requires. In contrast, the microcode controller, once in control, knows that the IP is no longer processing three machine instructions since, as mentioned above, machine instructions are not overlapped during execution of extended cycle instructions. The microcode controller can, therefore, act in a serial manner using microcode to execute the extended cycle instruction. The microcode programmer takes responsibility not to create the dynamic conditions (aborts) between pipeline stages that the microcode controller cannot handle. Other than the aborts/waits/halts control (item 7 above) the microcode controller provides the same type of IP instruction execution control signals as does the hardware controller, and additionally, provides some control signals unique to extended cycle instruction execution. Just prior to the beginning of the next to the last execution cycle, a clear signal is activated which passes control back to the hardware controller so that execution of the next machine instruction can begin.

In the preferred embodiment of the invention, the microcode controller consists of a main microcode controller and a second microcode controller (AD microcode controller) located in the arithmetic decimal section of the instruction processor. The AD microcode controller is utilized during execution of extended cycle decimal machine instructions.

For most decimal machine instructions, the sequence and timing of storage and GRS (General Register Set) references are fixed. In these cases, the main microcode controller and the AD microcode controller operate in a synchronized manner. The AD microcode controller receives a starting microcode address upon decoding of the decimal machine instruction and provides control signals for the operations performed by the arithmetic decimal section (AD section). Any necessary references to storage or GRS are accomplished by passing data on fixed cycles of the control system. For some decimal instructions, however, storage and GRS reference sequencing are not fixed. In these cases the AD microcode controller initiates the transfer of GRS and storage data and the main microcode controller is synchronized to and controlled by the AD microcode controller, through the use of a microcode index mechanism.

During execution of decimal instructions where references to storage and GRS are not fixed, the main microcode controller branches to the first address of a microinstruction table which is dedicated to that particular decimal instruction. This location contains a microinstruction, which is a branch to itself plus an index value supplied by the AD microcode controller. When no transfer to GRS or storage is required, the AD microcode controller sends a zero index. This forces the main microcode controller to loop at the first microinstruction table address. When the AD microcode controller determines that a data transfer is required, it sends a non-zero value in the index field. This index field causes the main microcode controller to branch to the first microinstruction of the requested data transfer routine. When the routine is complete, the main microcode controller either returns to the "wait" (zero index) microinstruction or executes a microinstruction which deactivates the "wait", thereby indicating that the decimal machine instruction is complete and that the IP is returning to a pipelined state.

BRIEF DESCRIPTION OF THE DRAWINGS

FIG. 9A and FIG. 9B when arranged as in FIG. 9, are a block diagram of the major sections of the instruction processor.

FIG. 12A through 12O is a listing of the machine instruction repertoire.

DESCRIPTION OF THE PREFERRED EMBODIMENT

A. The System

Figure 1:
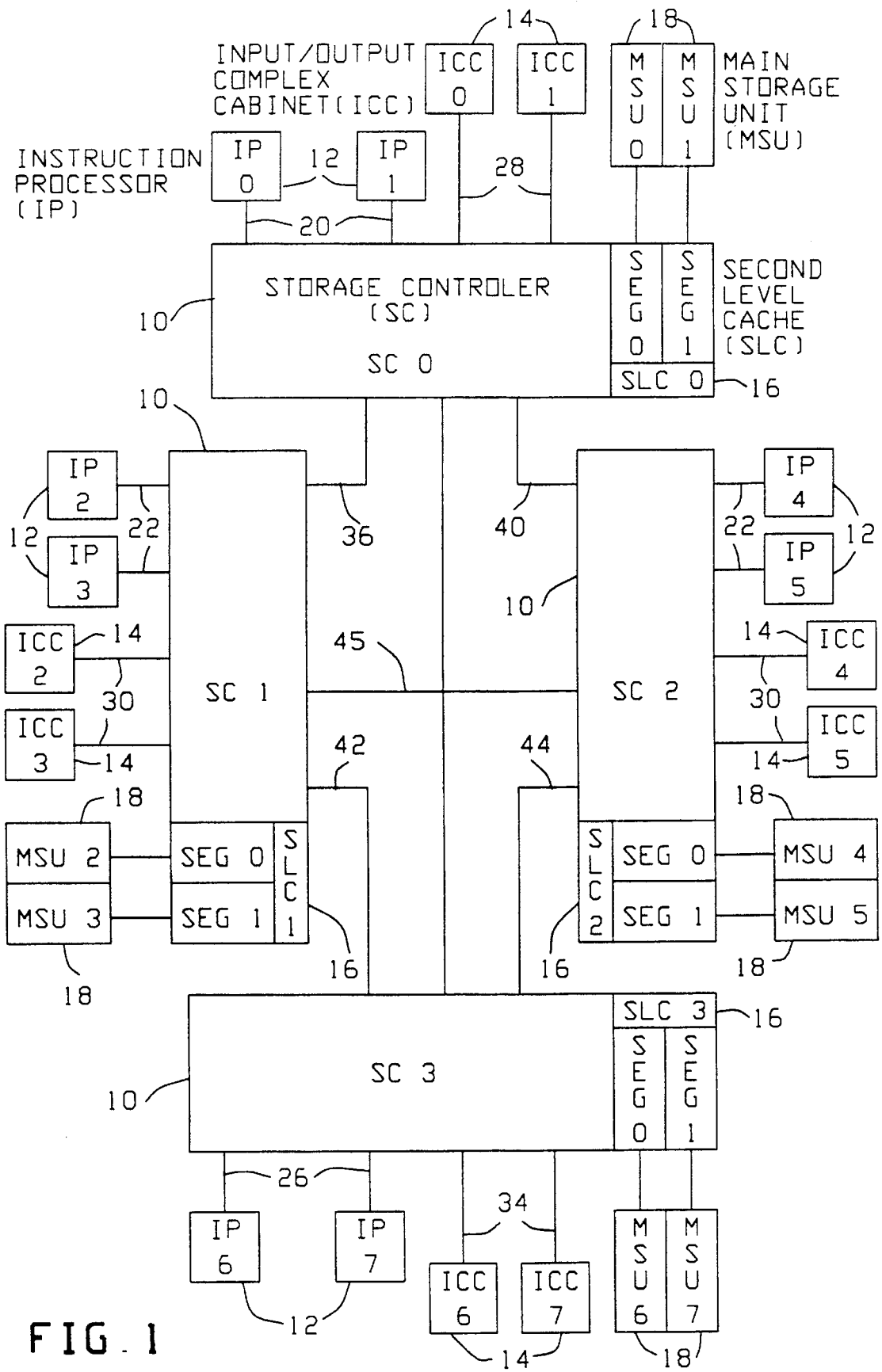
FIG. 1 is a block diagram of a data processing system utilizing the present invention.

FIG. 1 is a block diagram of a data processing system utilizing the present invention. The digital data processing system in which the invention can be utilized is essentially modular, and provides for parallel processing of machine instructions. The system utilizes from one to four Storage Controllers (SCs) 10 with each Storage Controller being directly connected to one or two local Instruction Processors (IP) 12, one or two local Input/output Complex Cabinets (ICC) 14 and one or two local Main Storage Units (MSU) 18. FIG. 1 illustrates a maximum system configuration utilizing four Storage Controllers, SC0 through SC3, each labelled 10, along with affiliated IPs, ICCs and MSUs. Each Storage Controller 10 provides access to the Main Storage Units 18 for all the units in the system. The configuration may be altered to select any combination of units.

Figure 8:
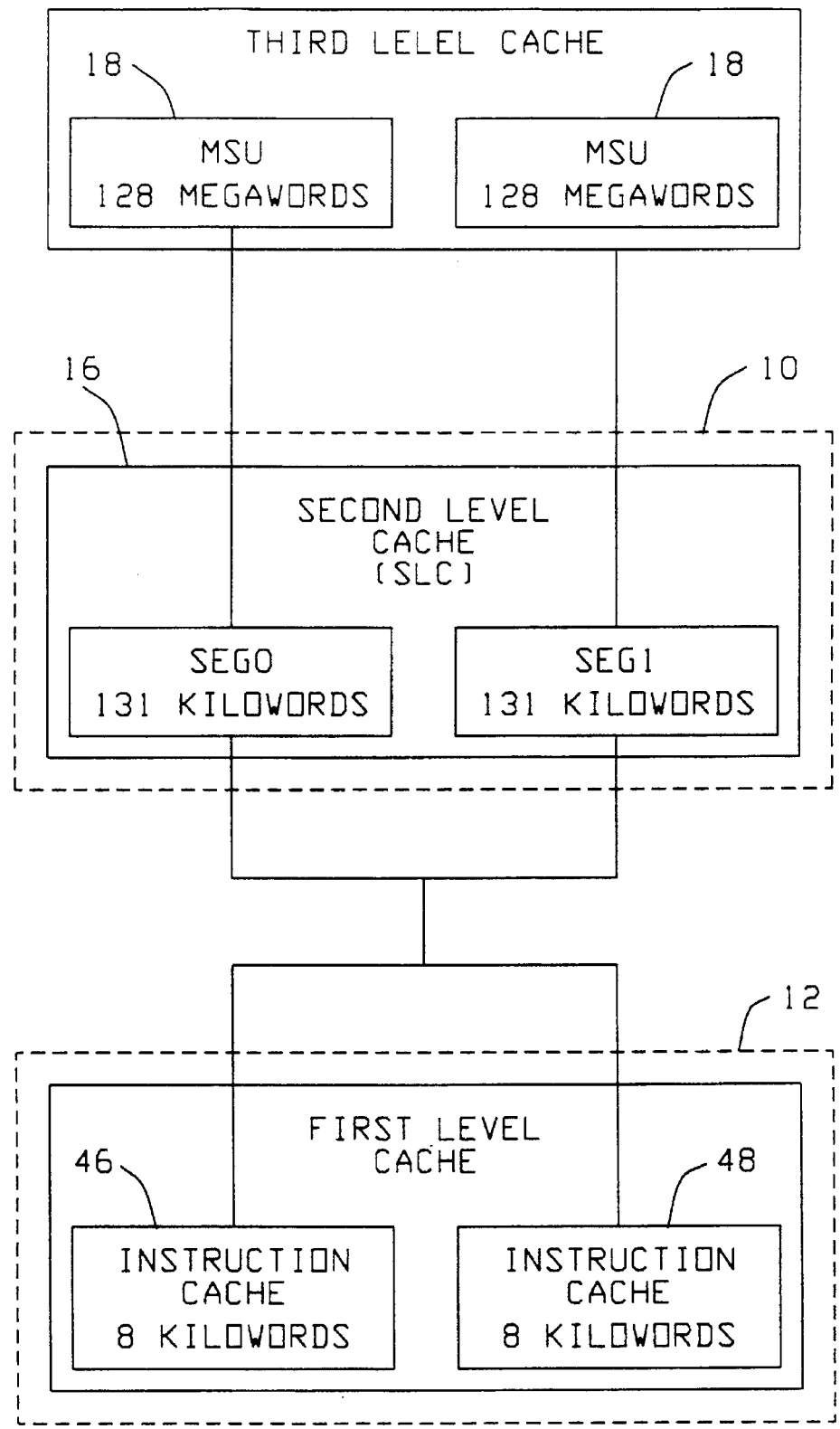
FIG. 8 is a block diagram of a typical storage hierarchy utilized in the data processing system shown in FIG. 1.

In conjunction with each Storage Controller 10 one or two Instruction Processors selected from IP0 through IP7, each labelled 12 can be utilized. The Instruction Processors are the basic instruction execution units of the system and provide basic mode and extended mode instruction execution and virtual machine capability. Each Instruction Processor includes a first level cache consisting of two cache memories (as shown in FIG. 8), one an operand cache and the other an instruction cache. The Instruction Processors 12 are functional to call instructions from memory, execute the instructions and store the results, and, in general, perform data manipulation. The specific operation of the instruction processor will be described in more detail hereafter.

In this configuration, two Input/output Complex Cabinets selected from ICC0 through ICC7, each labelled 14, are utilized in conjunction with each Storage Controller 10. The Input/output Complex Cabinets 14 provide the system interface and the input/output channels to support and access peripheral equipment (not shown).

Integrated in each Storage Controller 10 is a second level cache, SLC0 through SLC4, each labelled 16. Each second level cache includes two independent logical components called segments and identified as SEG0 and SEG1. They in turn are dedicated to one or two Main Storage Units selected from MSU0 through MSU 7, per Storage Controller.

As mentioned previously, the SCs 10 handle all interfaces between the different sections of the data processing system and the MSUs 18. These interfaces can be either local or remote. A local interface is an interconnection between sections connected to the same Storage Controller. Specifically, IP0 and IP1 12 interface locally with SLC0 16 and MSU0 and MSU1 18 through SC0 10 across communication paths 20 for both reading and writing of data. In a similar manner local interfaces are provided for associated IP2 through IP7 by communication paths 22, 24 and 26 to SC1, SC2, and SC3, respectively. Similarly, pairs of ICC0 through ICC7 connect to the associated Storage Controllers 10 through lines 28, 30, 32, and 34, respectively.

In addition to providing local interfaces, each Storage Controller 10 is directly connected to the other SCs in the system. This allows remote units of the system to communicate with all of the MSUs. In the configuration shown in FIG. 1, SC0, SC1, SC2, and SC3 are directly connected to each other by communication paths 36, 38, 40, 42, 44 and 45. This allows a Storage Controller to provide an interface between local units and the remainder of the system through one of the other remote Storage Controllers. For example, for IP0 12 to have access to a remote memory location such as MSU4, it must communicate through path 20 to SC0, which in turn communicates through path 40 to SC2 to provide the interface route to MSU4.

B. Clock Generation and Pipeline Sequencing

As mentioned previously, pipelining of instruction execution is a method of improving system performance by increasing the speed at which instructions are executed. Each functional operation which must be performed during execution of the instruction is divided into a separate execution stage. In the data processing system utilizing the present invention, a standard instruction requires three stages to execute. During the first stage the machine instruction is decoded and the addresses of any needed operands are generated. In the second stage any needed operands are fetched from memory. During the third stage the operation defined by the instruction is performed and the results are stored in memory. Pipelined execution of instructions take advantage of the fact that these functional operations take place within different areas of the instruction processor. This allows instructions to be overlapped during execution, such that each functional area or stage of the pipeline can be processing a different instruction at the same time. Therefore, once the pipeline is filled, one machine instruction completes execution every pipeline stage.

Figure 2:
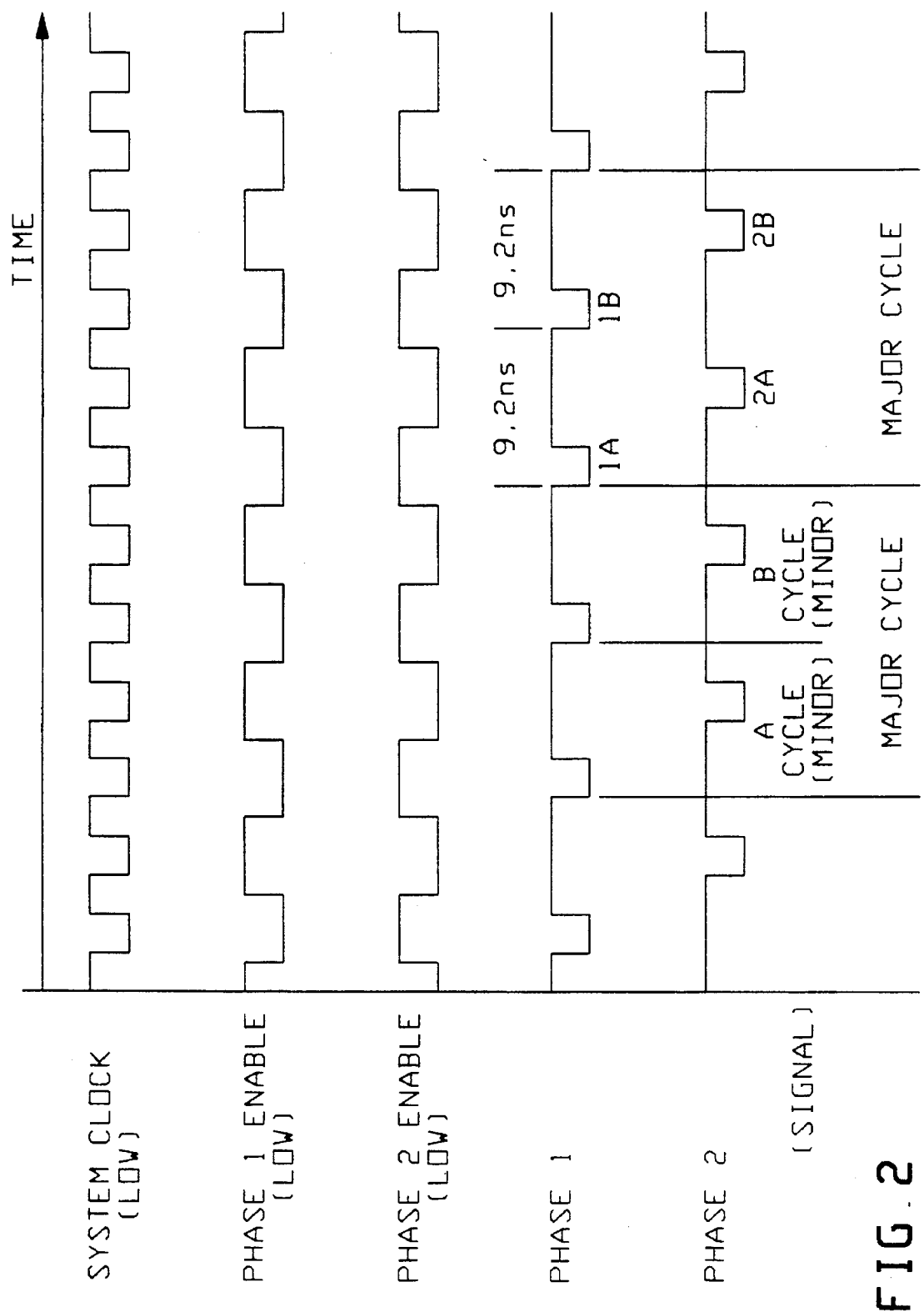
FIG. 2 illustrates the major and minor clock cycles of the machine instruction execution pipeline and how they are generated.

FIG. 2 illustrates the major and minor clock cycles of the machine instruction execution pipeline and how they are generated. The first line illustrates the synchronized high speed pulses generated by the system clock. The low pulses of this high speed clock are anded with the low pulses of a phase 1 enable and a phase 2 enable signal to create a phase 1 and a phase 2. These clock signals may be generated in a conventional manner well-known to those skilled in the art. The system operates from these two clock phases, phase 1 and phase 2, which are divided into major clock cycles (major cycles). Each major clock cycles consists of two minor clock cycles (minor cycles), an A cycle and a B cycle. Each minor cycle is 9.2 nanoseconds long and is further divided into two phases. The A cycle consists of phases 1A and 2A and the B cycle consists of phases 1B and 2B. Therefore, each major cycle is 18.4 nanoseconds and consists of four phases, phase 1A, phase 2A, phase 1B and phase 2B. Each major cycle is equivalent to one pipeline stage. Thus, during fully pipelined execution, one instruction completes execution every 18.4 nanoseconds. The majority of the sections of the instruction processor run at a major cycle rate although positions of the pipeline, specifically instruction fetch and decimal arithmetic run at a minor cycle rate.

Figure 3:
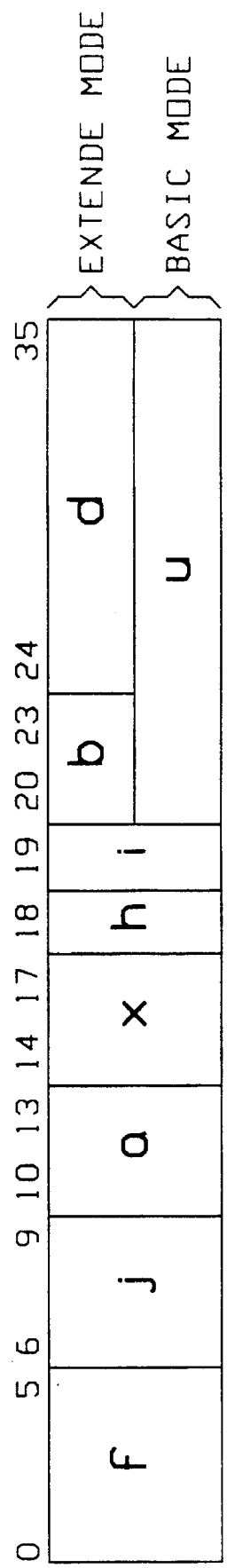
FIG. 3 is a diagram of the field format of a typical 36 bit machine instruction used in both extended mode and basic mode format.

FIG. 3 is a diagram of the format of the fields of a 36-bit machine instruction in both extended mode and basic mode instruction classes. The F-field or Function Code, consisting of bits 0 through 5, specifies the operation to be performed by the instruction. The J-field consisting of bits 6 through 9, is sometimes combined with the F-Field to act as part of the Function Code, but usually represents an instruction operand qualifier indicating whether the instruction operand is the entire 36-bit word specified by the instruction operand address, a subfield of that word or the instruction operand address itself (immediate operand). The A-field, located at bits 10 through 13, is usually the register operand address specifying the address of the register containing the operand. However, for some instructions the A-field acts as part of the Function Code. The X-field, at bits 14 through 17, is the index register address specifying an index register to be used in the indexing operation to form the instruction operand address. The H-bit at bit 18 is used to control index incrementation when the X-field of the instruction is non zero. The I-bit at bit 19 indicates indirect addressing in basic mode unless the instruction specifies an immediate operand. In the IP which incorporates this invention 'basic mode' denotes a basic set of machine instructions and capabilities, and 'extended mode' indicates a set of machine instructions that includes the basic mode instructions plus a set of additional instructions, thereby providing extended Operational Capability. In extended mode the I-bit is used either as an extension to the B-field or to indicate whether 18-bit or 24-bit relative addressing will be used. The B field at bits 20 through 23 in extended mode format is the base register selector which specifies a base register describing the bank containing the instruction operand. The displacement address in extended mode is specified by the D-field (bits 24 through 35) and in basic mode by the U-field (bits 20 through 35). Those fields contain a displacement value that is used in conjunction with the modifier portion of the index register specified by the X-field to form an instruction operand relative address. Although for purposes of this embodiment a 36-bit instruction is used it would be obvious to one skilled in the art that the innovation described herein could be utilized with instruction formats of varying length.

The machine instructions can be classified in either a first class of instructions that can be fetched and executed during a predetermined fixed number of major cycles, or in a second class of instructions that can be fetched and executed in a variable number of major cycles greater than the fixed number of cycles. By way of example, standard instructions such as Jumps, data moves, and simple arithmetic operations would characteristically be in the first class of instructions, and instructions requiring iterations or other more complex manipulations or functions would be in the second class of instructions.

Figure 4:
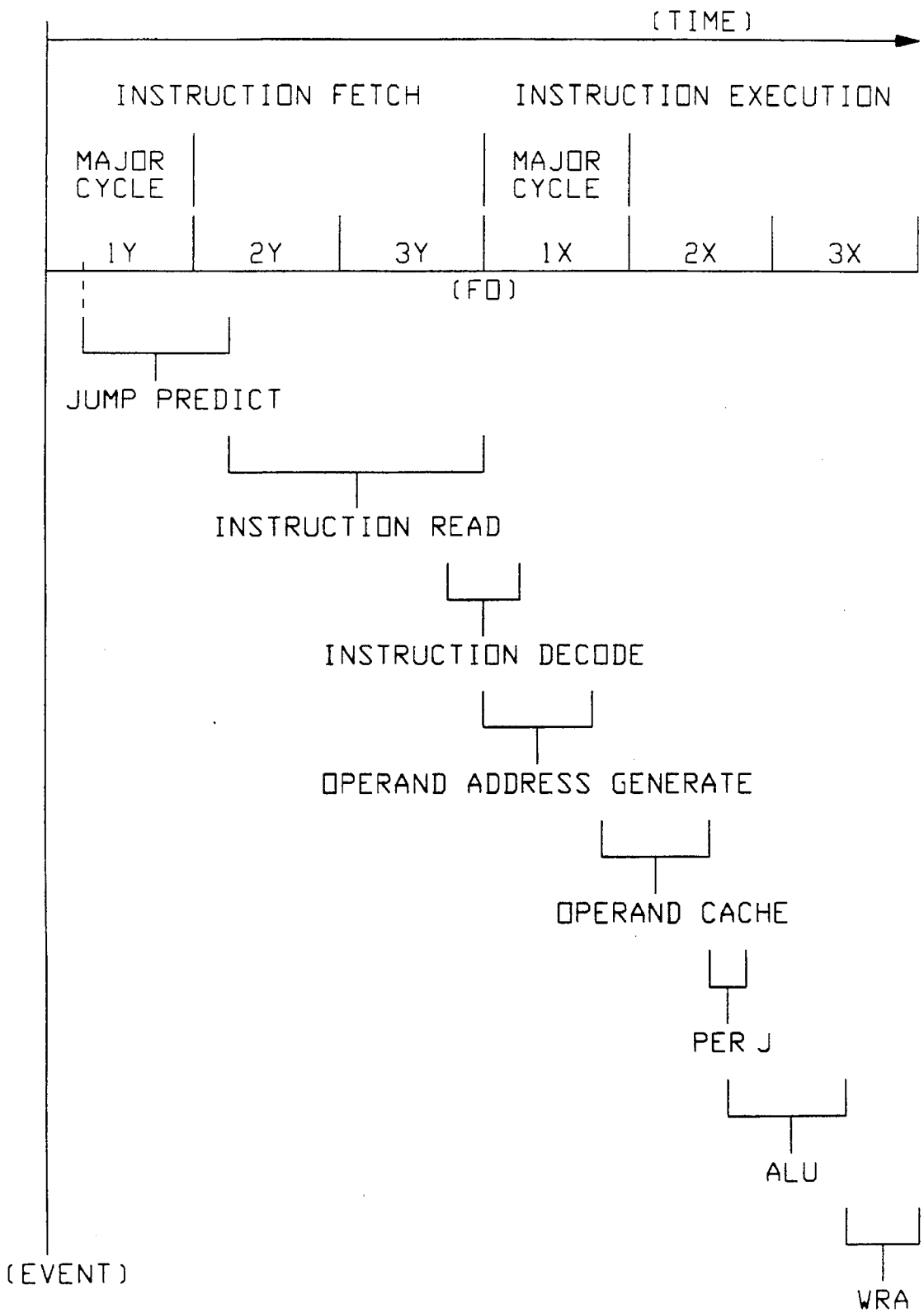
FIG. 4 is a timing diagram illustrating the sequencing of the fetch and execution cycles of a standard machine instruction.

The sequencing of the instruction pipeline can be understood with reference to FIG. 4. FIG. 4 is a timing diagram illustrating the sequencing of the fetching and execution cycles of a standard instruction. It can be seen that the instruction execution pipeline is three stages deep consisting of stages 1X, 2X, and 3X, each stage or window being one major cycle, or 18.4 nanoseconds in duration. FIG. 4 illustrates up to three major cycles of Instruction Fetch, labelled 1Y, 2Y, and 3Y, during which Jump Prediction may be active, the instruction is read, and the instruction is partially decoded. During Instruction Execution (1X, 2X, 3X) the instruction decode is completed, the instructions executed and the results, if any, are stored. The process to execute a complete instruction can take up to nearly six major pipeline windows (major clock cycles) in the case of extended mode where jump prediction is active.

As illustrated in FIG. 4, the movement of a standard instruction through the pipeline can be explained. At phase 2A (minor cycle) of stage 1Y for extended mode instructions, where jump prediction is active, the jump prediction circuitry will fetch a predicted address of the instruction. This function does not form an element of the present invention and will not be described further. At phase 2A of stage 2Y, that instruction is presented to the instruction fetch portion of the IP and it begins fetching that machine instruction. Since the instruction fetch portion of the IP operates at a minor cycle rate, both the predicted jump target address and the next consecutive instruction address are presented to the instruction fetch portion of the IP during the 2Y stage, with the next machine instruction being presented at phase 2B of 2Y. If in basic mode, or if jump prediction is not active in extended mode, the next consecutive instruction is presented to the instruction fetch portion of the IP at phase 2A of 2Y. The instruction arrives for execution late in the 3Y time period.

The Longer line between the 3Y and 1X stages in FIG. 4 labelled FO represents the time during which the Instruction Register (FO) is loaded. Instruction Decode begins slightly before FO is loaded and operand address generation occurs during the 1X stage. Late in the 1X stage an operand cache is referenced to locate the operand as will be described in more detail below. During the 2X cycle there is a fetch of single or double precision A-data which is the General Register Set (GRS) data specified by the A-field of the instruction, and a single or double precision operand specified by the U-field of the instruction. The operand data arrives in the arithmetic section (to be described below) late in the 2X cycle and Per J shifting is done to determine whether the instruction operand is the entire 36-bit word specified by the instruction operand address, a subfield of that word, or the instruction operand address itself in the case of an immediate operand. The ALU Operation (Arithmetic Logic Unit) occurs in the early part of the 3X cycle. Finally, in the late part of the 3X cycle, the write back to the A-Register (WRA) occurs. This procedure would be the sequence of instruction execution of an add to A, and is illustrative of the types of functions that can be pipelined.

Figure 5:
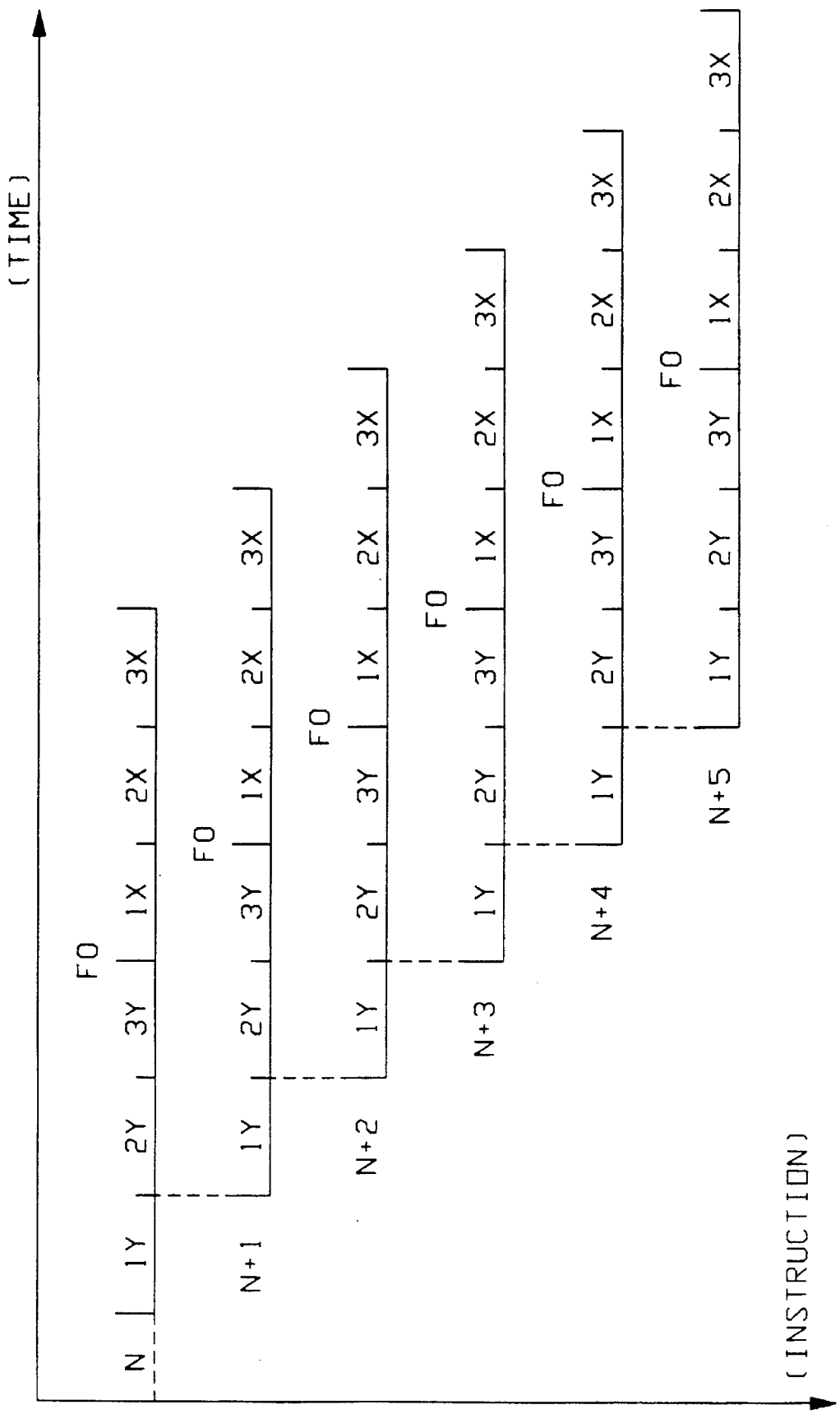
FIG. 5 is a timing diagram illustrating the pipeline instruction overlap of six consecutive standard instructions (N through N+5).

FIG. 5 is a timing diagram illustrating the pipeline instruction overlap of six consecutive standard instructions, N through N+5, during fully overlapped execution. The drawing shows the normal pipeline sequence of the instructions through both the three stages of Instruction Fetch (1Y, 2Y, 3Y), and the three stages of Instruction Execution (1X, 2X, 3X). In fully overlapped operation, one instruction will complete every major cycle, or every 18.4 nanoseconds.

For complex or extended cycle instructions the pipelining of instructions is suspended. 'Complex' or 'extended' cycle instructions are those which require four or more major cycles to execute and cannot be completed during the predetermined number of major cycles for the first class of instructions. Suspension of the pipeline is accomplished by delaying the load of the next instruction into the Instruction Register (FO). This delay is called CD Slip, and will be described below.

Figure 6:
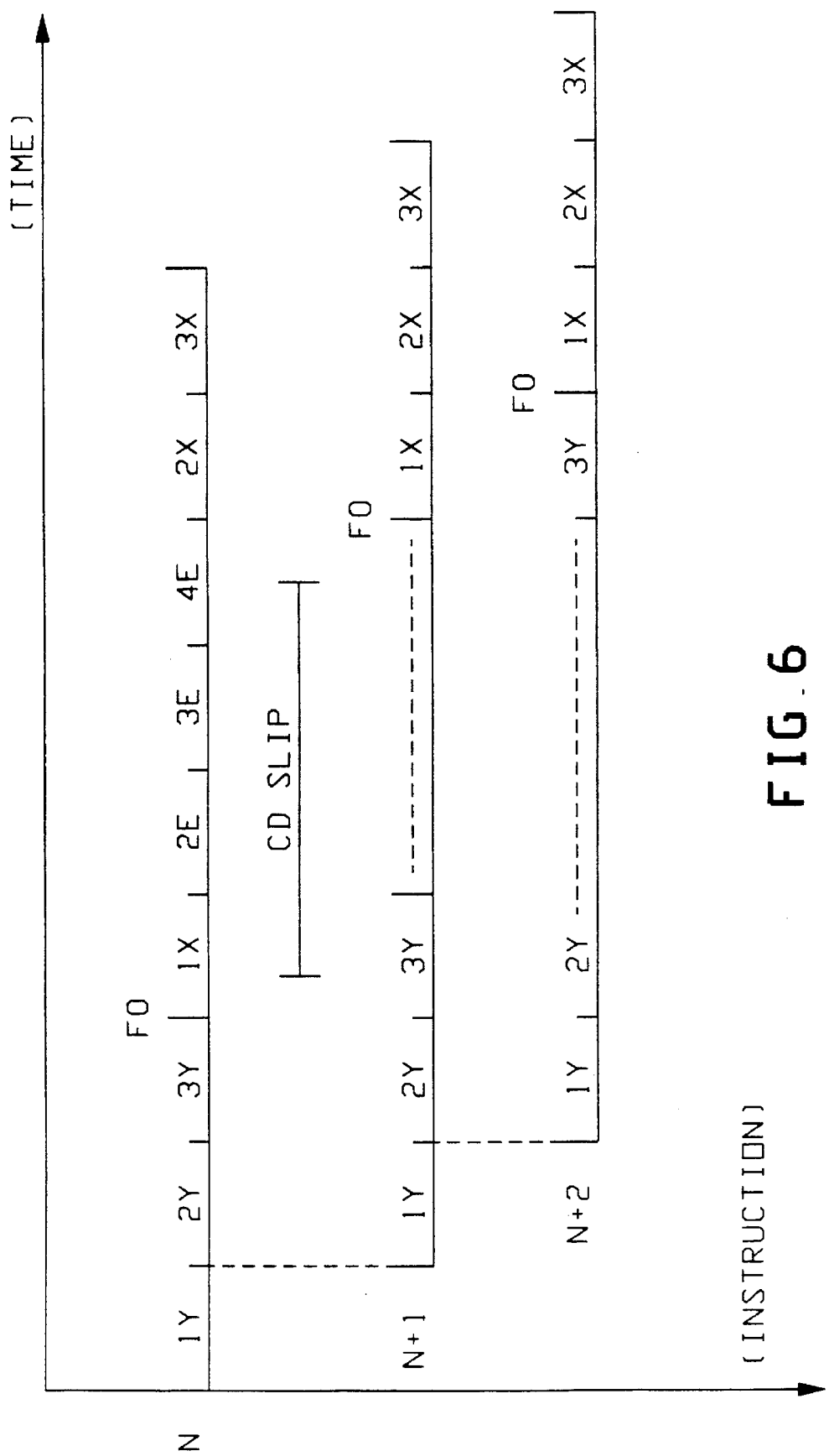
FIG. 6 illustrates the (non-overlapped) operation of the instruction pipeline for extended cycle instructions.

FIG. 6 is a timing diagram illustrating the suspension of the instruction execution pipeline when an extended cycle (complex) instruction is executed. Three consecutive instructions (N, N+1, N+2) are shown, instruction N being an extended cycle instruction. The CD Slip activates as soon as the instruction is decoded and determined to be an extended cycle instruction, which occurs at the end of the first phase of 1X. The CD Slip continues during the execution of the complex instruction until one minor cycle prior to the beginning of the next-to-last (2X) pipeline cycle before the end of the instruction. This results in the loading of a new instruction (N+1) into the Instruction Register FO and normal pipeline execution of the instructions already in the pipeline is resumed. The extra pipeline cycles required while the IP execution is slipping are shown at 2E, 3E, 4E, . . . NE. The last two cycles after the slip is terminated are called 2X and 3X as in normal pipelined operation, and during that time the next instruction is loaded and the overlapping of machine instructions is resumed.

During execution of extended cycle machine instructions a pipeline technique and overlapped operation, the same as that used for standard instructions, is utilized. The extended cycle instructions are broken into tasks which are overlapped in the same manner as standard instructions, however, such tasks are controlled by microcode. A series of control signals are read from a microcode memory (RAM or ROM) and the bits are used to enable control signals in the instruction pipeline. Each cycle (stage) a new microinstruction is read from microcode memory. The sequencing and timing of the microinstruction pipeline are described further below.

Figure 7:
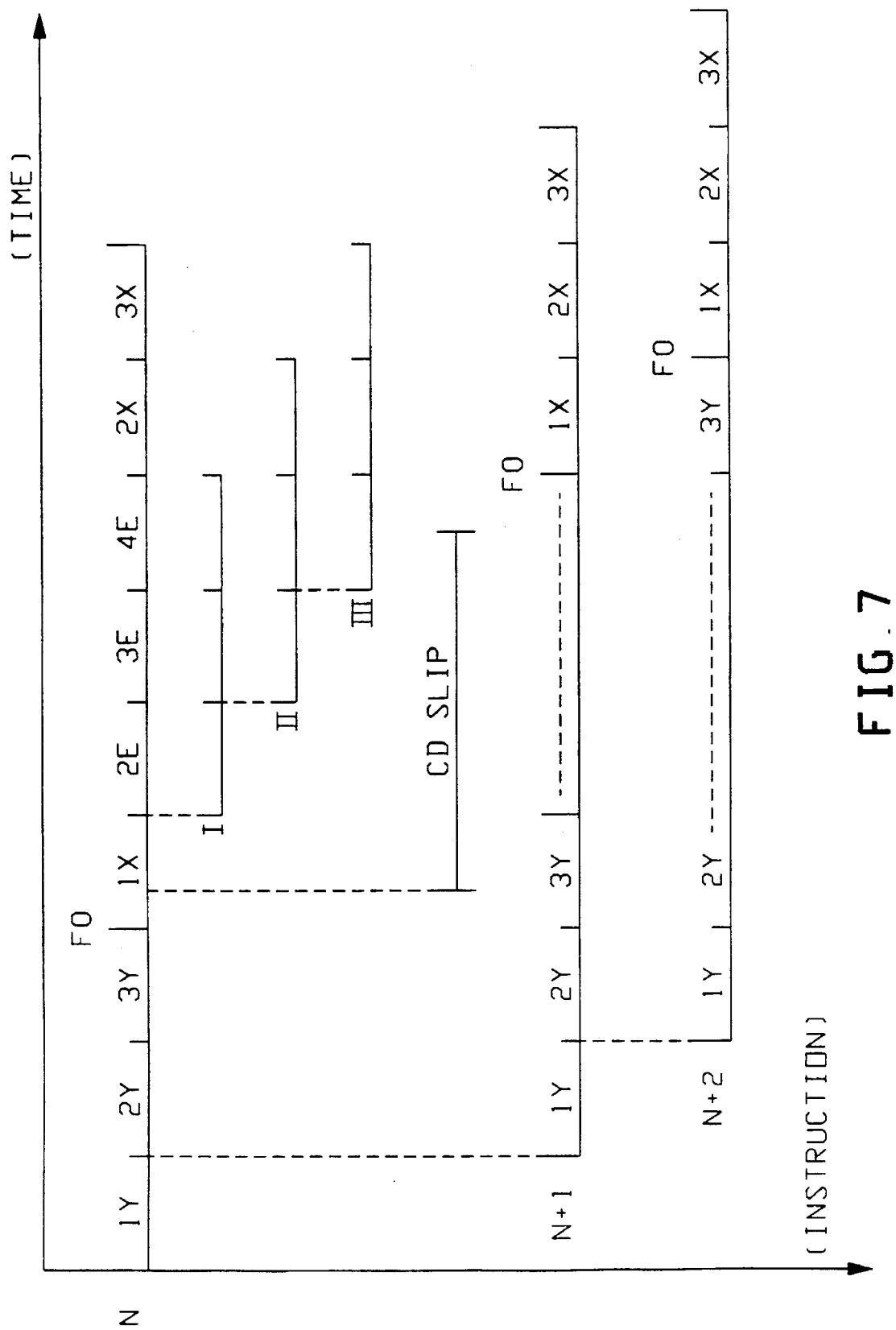
FIG. 7 is a timing diagram illustrating the overlapped execution of microinstructions.

FIG. 7 is a timing diagram illustrating the overlapped execution of microinstructions. FIG. 7 is similar to FIG. 6 except that extended cycle instruction N is broken into Tasks I, II and III. Control of Tasks I, II, and III, is provided by microinstructions I, II, and III respectively. The execution of the microinstructions is overlapped with microinstruction I commencing at stage 2E, microinstruction II at 3E and microinstruction III at 4E. The pipelining of machine instructions is resumed at the beginning of the 2X stage of instruction N.

C. Storage Hierarchy

FIG. 8 is a block diagram of the storage hierarchy used in the data processing system shown FIG. 1. For purposes of a typical representation, the storage hierarchy is shown with respect to a single Instruction Processor 12 connected to a Storage Controller 10, which in turn interfaces with Main Storage Units 18. It will be understood that each IP will have a similar storage hierarchy.

Instruction Processor 12 includes two first level caches, an Instruction Cache 46 and an Operand Cache 48, both caches being 8 kilowords for this embodiment. In order to improve the speed of the system, Second Level Cache (SLC) 16 is included. First level cache's 46 and 48 can have access to either SEG0 or SEG1 of SLC 16, which is integrated within Storage Controller 10. Each segment (SEG0 and SEG1) of the Second Level Cache contains roughly 131 kilowords of storage capacity. Although not shown, in the preferred embodiment the segments are divided into 2,048 sets with two 32 word block's per set, while the memories in the Instruction Cache 46 and Operand Cache 48 are arranged in four blocks with each block being 1K by 2 words deep.

Even though the size of the first level caches 46 and 48 are relatively small (8 kilowords), the effect of a storage miss in those caches is not significant because of the fast access time to the Second Level Cache 16. If, however, the IP needs information that's not located in either the first level caches 46 and 48, or the Second Level Cache 16, then the Storage Controller 10 must fetch the information from one of the Main Storage Units which considerably increases the access time.

In order to improve system performance a prefetch technique is used when accessing information from a Main Storage Unit 18. When accessing an MSU the Storage Controller 10 will cause 32 words to be fetched. These 32 words are put into the Second Level Cache 16. Of those 32 words, 8 are passed to an 8 word read buffer located in either Instruction Cache 46 or Operand Cache 48 depending on which one made the request. Even though the IP may have a current need for only two words, by prefetching 32 words into the SLC and passing 8 of those words along to the first level cache, the system is able to anticipate and stay ahead of the needs of the IP. This prefetch technique is successful since it is likely that the address of the next information needed will be located in the same local area. Thus, when that information is needed it will be located in either a first level cache 46, 48, or Second Level Cache 16, and no access to a Main Storage Unit 18 will be necessary. This significantly speeds up the operation of the system since the access time from an IP 12 to either a first level cache or a local SLC is significantly faster than the access time to either a local or remote Main Storage Unit. For example, the access time for information located in either of the first level caches 46, or 48 is about 3 minor clock cycles. The access time to a local SLC 16 is four major cycles, while the access time to a local MSU is 14 major cycles. If an IP must have access to information contained in a remote SLC or MSU two additional major cycles are needed. Therefore, the access time to a remote SLC or remote MSU is six major cycles and 16 major cycles, respectively.

D. Instruction Processor

Figure 9B:
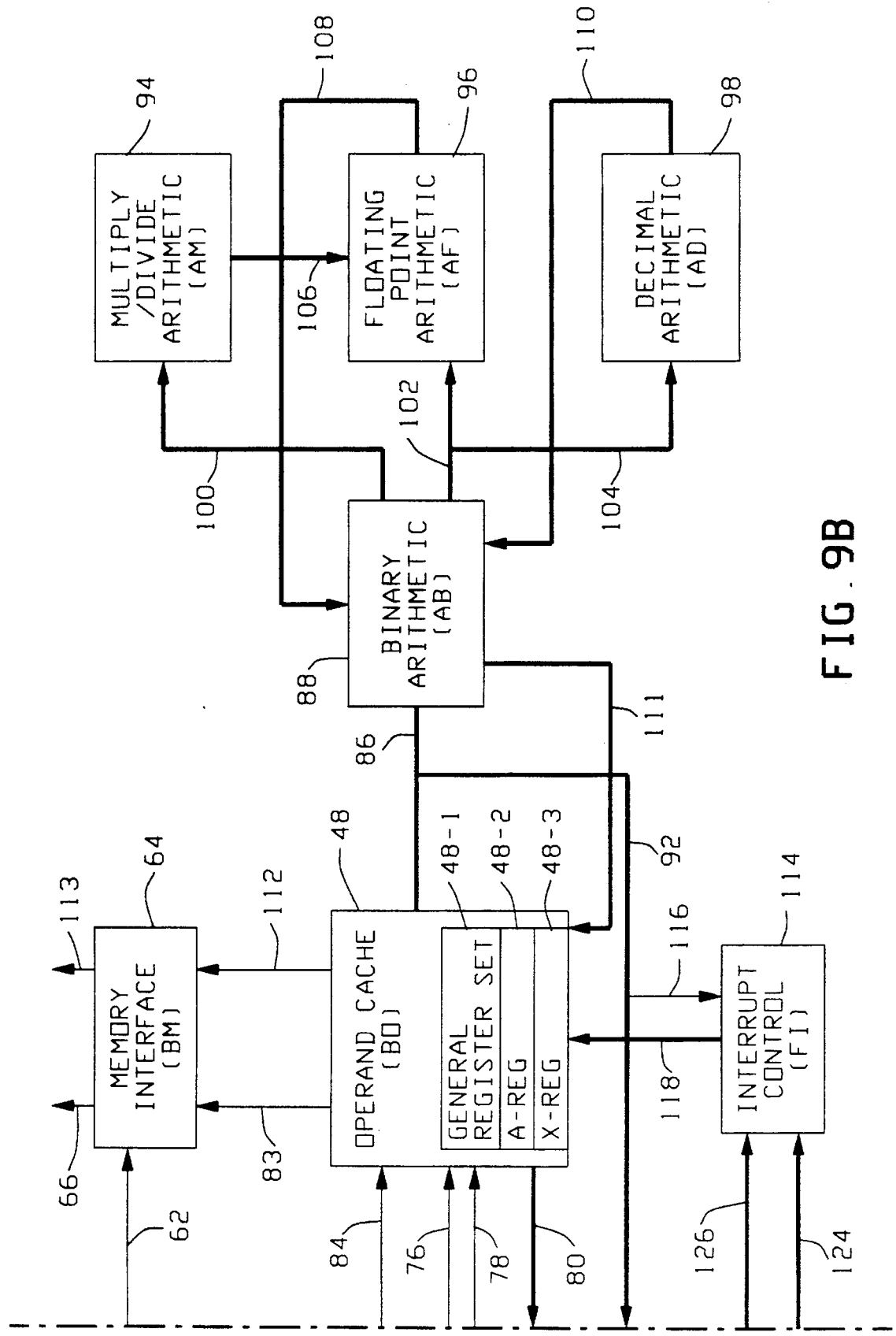

FIG. 9A and FIG. 9B, when arranged as in FIG. 9, are a simplified block diagram of the major sections of an Instruction Processor 12. Certain address, data and control paths are shown in order to facilitate an understanding of the various sections and how they interrelate. It should be noted, however, that not all of the data, address or control paths are shown.

Instruction Processor 12 consists of multiple sections. An Instruction Address Generate section (CI) 50 consists of a Jump Predict subsection 52 and an Instruction Read subsection 54. The function of CI 50 is to generate a 47-bit absolute instruction address. The absolute instruction address is formed by adding the relative address of the instruction to the base address field of a designated base register using two's complement arithmetic. Paging is then utilized to convert the absolute address to the real address of the instruction in storage. The system is equipped with a jump prediction feature (not shown) which, when activated, supplies a predicted target address for each instruction executed. The details of the generation of these addresses are not set forth herein since they are not necessary to an understanding of the present invention.

The Instruction Read subsection 54 provides instruction cache (BI) 46 with the 47 bit instruction absolute address on address path 56. At this point the absolute address is converted to a real address by the paging process. If the instruction is found to be resident in the Instruction Cache 46, the 36 bit instruction word is provided to an Instruction Decode section (CD) 58 on data path 60 loading Instruction Register FO 59 with the current instruction. If the instruction is not resident in the Instruction Cache 46, the Instruction Processor 12 suspends instruction execution and initiates a memory read. Memory access to the SLC 16 or MSU 18 is made across address path 62, through a memory interface section (BM) 64, which provides direct access to the local Storage Controller 10 on address path 66. As described previously, Storage Controller 10 provides a direct interface to the local SLC 16 and MSUs 18, and indirectly through one of the other Storage Controllers, to remote Second Level Cache 16 and Main Storage Units 18. When the memory is read (either SLC 16 or MSU 18), the instruction read is provided on data path 68 from Storage Controller 10 directly to Instruction Cache 46. The instruction is then sent to Instruction Register (FO) 59 in CD section 58 on data path 60. p The function of Instruction Decode section 58 is to decode the instruction in order to provide hardware instruction decode control signals to the other sections of Instruction Processor 12. The hardware control signals may be provided entirely from electronic circuits and hardware logic circuits. In the preferred embodiment the hardware control signals are provided from a combination of hardware decodes and a RAM translate table.

The Instruction Decode section 58 provides these signals to control the instruction execution pipeline for all stages of standard instructions and for the first stage of extended cycle instructions. Control for stages subsequent to the first for extended cycle instructions is provided by microcode. Specific details regarding the generation of the control signals and the circuitry for selection of hardware or microcode control is contained in Section E.

The hardware control signals generated by Instruction Decode section 58 include addresses for General Register Set (GRS) 48-1 including A-Register 48-2 and X-Register 48-3, and displacement, which are provided to an Operand Address Generate section (CO) 72 on address path 74. The CO section 72 utilizes that information to generate a 24 bit operand absolute address, which it transfers along with 7 bit GRS 48-1 read and write addresses, to the Operand Cache (BO) 48 on address path 76. CO 72 also generates and provides incremented X-Register data to Operand Cache 48 on data path 78. X-Register data for storage in a Duplicate X-Register File 72-1 maintained in the CO section 72 is received from Operand Cache 48 on data path 80. An 18-bit operand relative address is also generated in the CO section 72 and sent to the CI section 50 through address path 82.

Once the absolute operand address has been received by the Operand Cache 48, a determination is made whether the operand is resident in the Operand Cache. If the operand is not resident, the Instruction Processor 12 will suspend instruction execution and initiate a memory read using a real address generated during a paging process, which occurs in the Operand Cache 48 in parallel with the determination of residency. Access to the memory (SLC or MSU) is provided by directing the operand real address across address path 83 to the Memory Interface 64, which in turn provides the operand real address to the Storage Controller 10 on address path 66. Storage Controller 10 provides access to the memory and fetches the operand. The operand is provided on data path 68 through Instruction Cache 46 and across data path 84 to Operand Cache 48.

Operand Cache 48 runs on a minor cycle rate. During the first minor cycle of the first pipeline stage a single or double precision data signal is provided on data path 86 to a Binary Arithmetic section (AB) 88. This data is the first operand (A or A+1) specified by the A-field of the instruction. On the next minor cycle the U data is passed across data path 86, single- or double-precision based upon the instruction. The operand data on data path 86 is also sent to other sections of the Instruction Processor 12 on data path 92, the purpose of which will be discussed later.

The Binary Arithmetic section 88 functions as the central interface between the other arithmetic sections and the Operand Cache 48. The operand data is distributed from AB section 88 to Multiply/Divide Arithmetic section (AM) 94, Floating Point Arithmetic section (AF) 96, and a Decimal Arithmetic section (AD) 98 via data paths 100, 102, and 104, respectively. The Binary Arithmetic section 88 also receives the outputs of each of the other arithmetic sections. Specifically, the output of AM section 94 is sent to AF section 96 across data path 106, which then provides the outputs of both sections to AB section 88 on data path 108. The output of AD subsection 98 is provided to AB section 88 on data path 110. The AB section then provides the arithmetic output to the Operand Cache 48 on data path 111. If there is to be a memory store, the data is received from Operand Cache 48 on data path 112 by Memory Interface 64, which passes the data to a Storage Controller 10 (not shown) on data path 113.

As mentioned previously, the operand data is provided to other sections of instruction processor 12 on data path 92. An Interrupt Control Section (FI) 114 receives a single 36-bit operand word on data path 116. This data provides FI section 114 with various information, including data needed to maintain the active processor state. The FI section 114 performs the operations required to make processor state changes and to ensure processor state integrity. Processor state data is passed from FI subsection 114 to the Operand Cache 48 on data path 118.

The Operand Cache data on address path 92 branches and is also provided to an Addressing Environment section (CB) 120 on data path 122. CB section 120 includes Base Registers 120-1, and a virtual address translator (not shown). The output of CB section 120 is provided to FI section 114 on data path 124. Additional data is sent on data path 126 to FI section 114 for eventual storage in Operand Cache 48 via data path 118.

Indirect operands, EX and EXR target words from Operand Cache 48 are sent to the Instruction Decode subsection 58 and any word from operand cache 48 is sent to a Main Control Store section (CS) 128 through data path 129. Main Control Store 128 includes a 4K by 320 bit microcode RAM and a microcode controller consisting of 10 duplicate function sections each controlling 32 microcode bits. The Main Control Store 128 provides the microcode control of the instruction for extended cycle instructions as will be discussed in more detail in the following Section E dealing with instruction processor control. The Main Control Store 128 also provides the control for operations within the instruction processor which are not related to specific instructions such as control for interrupt processing and for processor state changes.

E. Pipeline Control

1. Dual Hardware/Microcode Pipeline Control

Figure 10:
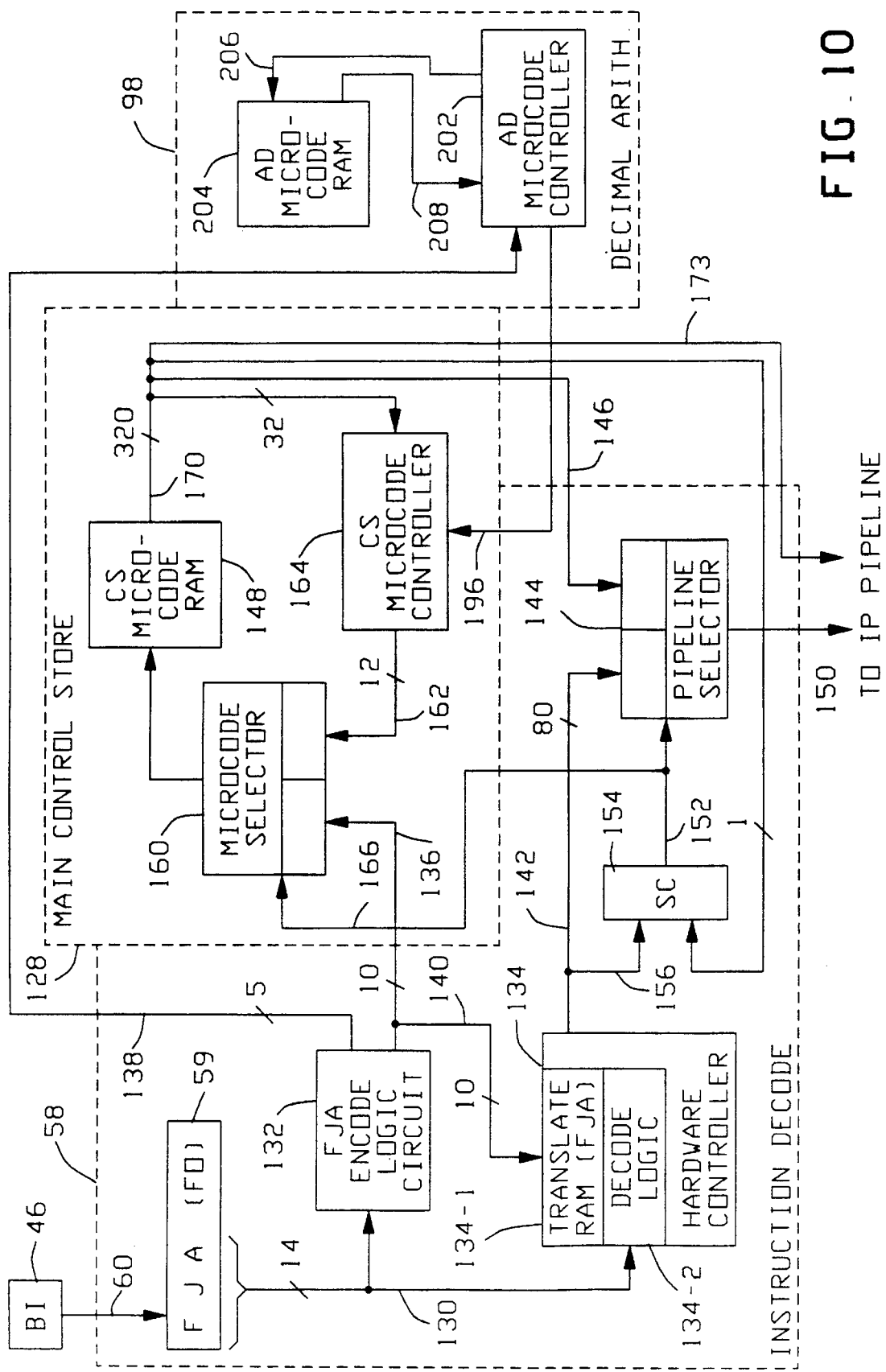
FIG. 10 is a functional block diagram illustrating the features and interconnections of the dual pipeline control system.

FIG. 10 is a functional block diagram of CD section 58, CS section 128 and AD section 98 of the instruction processor, and illustrates the features and interconnections of the dual pipeline control system.

Upon receipt of an instruction from the Instruction Cache (BI) 46 on line 60 the FJA-Fields of the instruction are sent from the Instruction Register FO 59 across line 130 to both FJA Encode Logic Circuit 132 and Hardware Controller 134. FJA Encode Logic Circuit 132 compresses the 14-bits of the FJA-Fields to 10-bits through logic circuitry which selects which of four levels of encode logic circuitry will be used to encode the bits. The specific encoding procedure utilized will be described with regards to FIG. 11.

The 10 bit vector address is also sent from FJA Encode Logic Circuit 132 to the Hardware Controller 134 over line 140, and is used to address a Translate RAM 134-1. The Translate RAM 134-1 contains a unique set of control bits for each machine instruction. Additionally, the 14 bits of the FJA Fields are received and decoded by Decode Logic 134-2 circuitry in Hardware Controller 134 to produce additional control bits. The control bits from the Translate RAM 134-1 and the Decode Logic 134-2 are combined to form an 80-bit hardware control word on line 142, each of the bits of which provides a unique hardware control signal. Although in the preferred embodiment the hardware control signals are produced from a combination of hardware Decode Logic 134-2 circuitry and bits addressed from a Translate RAM 134-1, it would be well-known to one skilled in the art that the signals could be generated entirely by hardware Decode Logic circuitry without departing from the scope of the invention.

The control word on line 142 provides one of the inputs to a two to one multiplexer Pipeline Selector 144. The other input is received on line 146 from CS Microcode RAM 148. The Pipeline Selector 144 multiplexer functions to select either the hardware control word on line 142 or a CS microcode control word on line 146 to be provided on line 150 as the control for the instruction execution pipeline. The selection is made by a selection signal received on line 152 from Latch 154.

Latch 154 is set by one bit of the hardware control word on line 142, called a slip bit, which is received on line 156. For standard instructions which can be completed in one three stage pipeline, the slip bit is not set, and the output of Latch 154 on line 152 is zero. The zero on line 152 causes the Pipeline Selector 144 multiplexer to select the hardware control word on line 142 to be provided for pipeline control on line 150. For extended cycle instructions the slip bit is set at the end of the fourth clock cycle of the first pipeline stage (1X). When the slip bit is set, the output of Latch 154 on line 152 is one. This produces a selection signal on line 152 called CD SEL CS CTRL (CD Select CS Control). This signal causes the selection of the CS microcode control word on line 146 to be provided to the instruction processor pipeline for control on line 150. Thus, for extended cycle instructions the CD section 58 provides hardware control for the first pipeline stage, and then control is transferred to the CS section 128, which provides microcode control for the remaining pipeline stages necessary to complete the instruction. Once Latch 154 is set, control of the pipeline will continue to be provided by CS microcode until the latch is cleared by a CS microcode bit on line 158 in a manner which will be discussed in more detailed hereafter. It will be appreciated that the transfer to microcode control could be done prior to the start of the first pipeline stage of execution for extended cycle instructions. However, in this embodiment of the invention it has been found advantageous both from the standpoint of speed and hardware utilization to transfer control as discussed above.

Control Store (CS) section 128 receives the 10-bit vector address on line 136 at one of the inputs to a 2 to 1 Microcode Selector 160 multiplexer. The other input into Microcode Selector 160 multiplexer consists of a 12-bit microcode branch address received on line 162 from CS Microcode Controller 164. The 12-bit microcode branch address is produced by CS Microcode Controller 164 in a manner which will be discussed in more detail hereafter. Microcode Selector 160, like Pipeline Selector 144, is controlled by the selection signal output from Latch 154 on line 166, a branch of line 152. When the output of Latch 152 is zero, which is the case for standard instructions and for the first pipeline stage of extended cycle instructions, the Microcode Selector 160 multiplexer selects the 10 bit vector address on line 136 as its output. That output is provided on line 168 and is used to address CS Microcode RAM 148.

Figure 16:
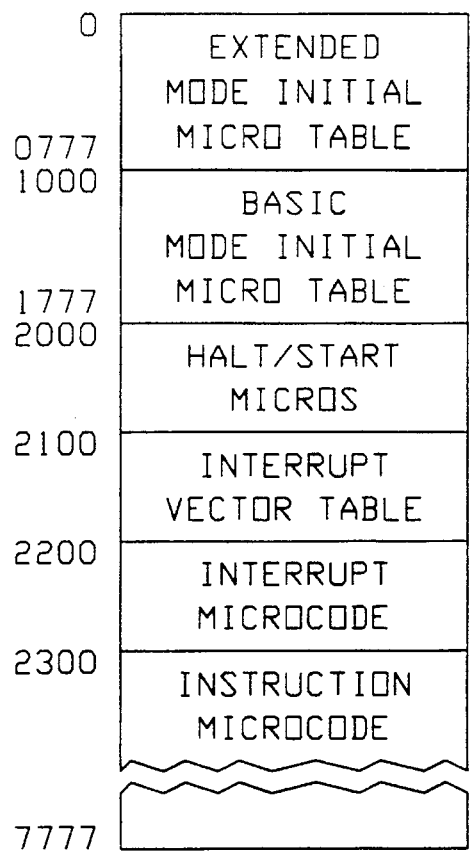
FIG. 16 is a microcode memory map of the 10K octal Control Store (CS) microcode memory.

The size of CS microcode RAM 148 is dependent upon the number of microinstructions which must be stored. In the preferred embodiment the RAM is 4K deep (10K octal) by 320 bits wide. FIG. 16 is a microcode memory map of the 10K octal memory. An extended mode initial micro table occupies addresses 0 to 0777 and contains the initial microcode instruction of a microprogram for each extended mode machine instruction. The basic mode initial micro table at addresses to 1000 to 1777 contains the initial microcode instruction of a microprogram for each basic mode machine instruction. Since these initial microcode instructions occupy less than 1K (1024) decimal address spaces they may be addressed by the 10 bit vector address produced by FJA encode logic circuit 132. Address spaces 2000 to 2100 contain halt/start micros. Address 2100 to 2200 contain an interrupt vector table and interrupt micros are contained at addresses 2200 to 2300. The remainder of the microinstructions needed to complete the microprograms necessary for each machine instruction are contained at addresses 2300 to 7777.

Once the initial micro table is addressed using the 10 bit vector address, in order to complete the microprogram necessary to execute an extended cycle instruction the microcode must branch to the microinstructions at addresses 2300 to 7777. Referring again to FIG. 10, the branch to these microinstructions is accomplished utilizing bits contained in a 320 bit microcode control word which is initially addressed from the initial micro tables and is provided on line 170 by CS microcode RAM 148. Thirty two of the control bits, the branch microcode control words, are provided on line 172 and combined with other machine status information by CS microcode controller 164 to form the 12 bit microcode branch address on line 162 which is used as the second input to multiplexer 160 as previously described.

When selected by multiplexer 160 during extended cycle instruction operation this 12 bit address is used to address the next microinstruction in the microprogram. Some of the 320 control bits are provided on line 146 to multiplexer 144 for selective pipeline control in the manner previously discussed. One of the bits, called a CLR SLIP bit (clear slip) is provided on line 158 to the clear input of latch 154. This bit is set by the last microinstruction of the microprogram and clears latch 154 so that the system is ready to proceed with the next machine instruction. Still other control bits are provided directly to the instruction processor instruction pipeline on line 173. These control bits are for unique instruction processor functional control, the specifics of which are not related to this invention and will not be discussed in detail.

Figure 18:
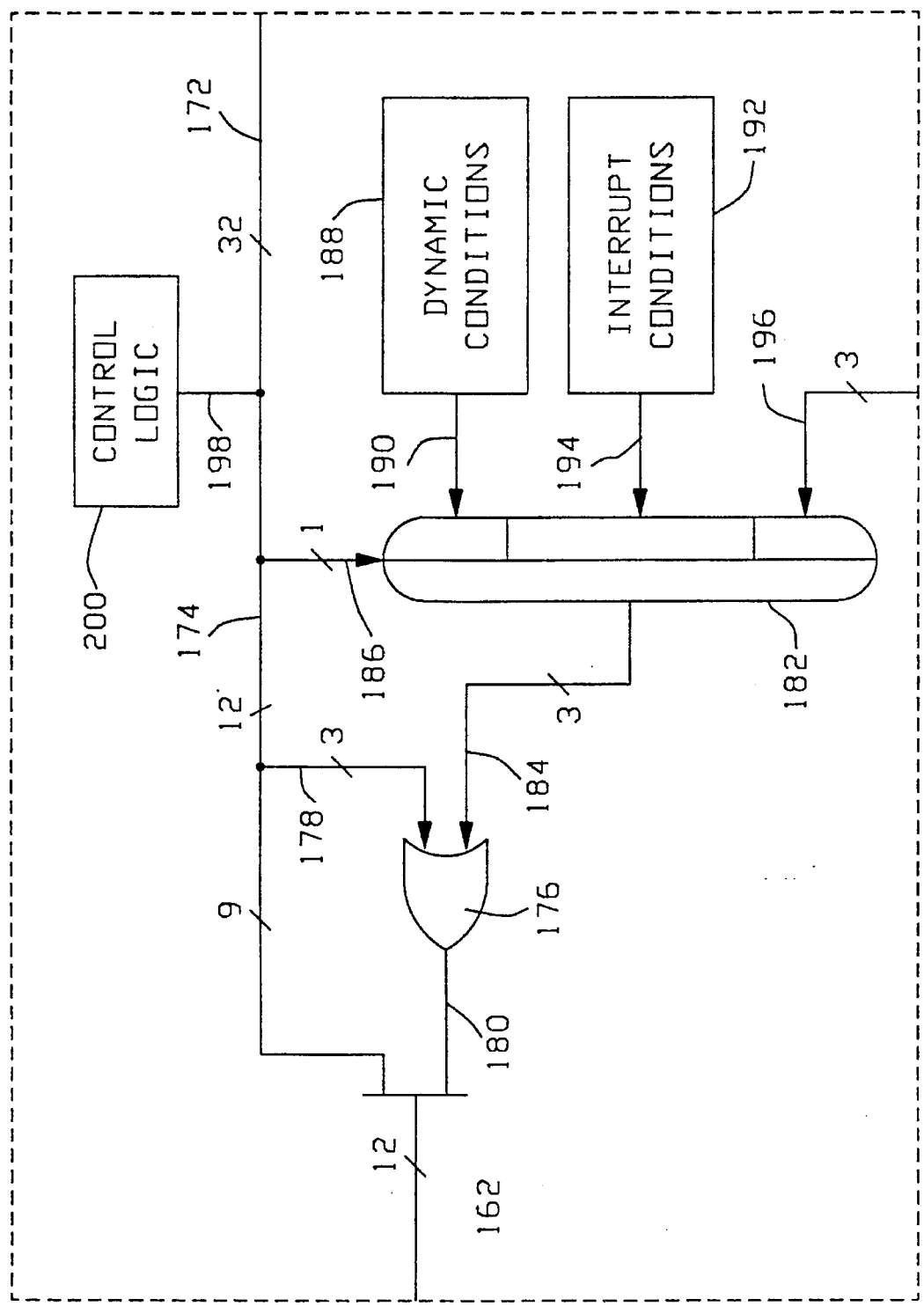
FIG. 18 is a diagram of a portion of the logic used to generate the CS Branch Microcode addresses for completing execution of extended cycle instructions.

The operation of CS microcode controller 164 can be understood with regards to FIG. 18 which is a diagram of a portion of the logic used to generate the 12 bit branch microcode address on line 162. Twelve of the control bits received on line 172 by CS microcode controller 164 are used to formulate the branch microcode address. These 12 bits are separated on line 174. The 3 least significant bits of the 12 bit address are provided to an Or Gate 176 on line 178 while the 9 most significant bits are catenated with the output of Or Gate 176 provided on line 180. The results of that catenation are provided on line 162 and form the 12 bit target microcode address which is received by multiplexer 160 as one of its inputs.

Each microprogram has a number of possible addresses to which the microcode may branch depending upon certain system conditions. These conditions are selected by multiplexer 182 and provided on line 184 as the other input to Or Gate 176. The selection is made by a control signal received by multiplexer 182 on line 186 which consists of one of the 32 control bits provided on line 172. This control signal selects one of the inputs to multiplexer 182 consisting of dynamic conditions 188 provided on line 190, interrupt conditions 192 provided on line 194 or 3 decimal control bits provided on line 196 by AD section 98. Dynamic conditions 188 and Interrupt conditions 192 consists of various system status conditions not related to this invention and will not be discussed further. The decimal control bits are provided on line 196 from AD Microcode Controller 202 located in AD Section 98. Referring again to FIG. 10, AD Microcode Controller 202 provides pipeline execution control for decimal instructions by addressing AD Microcode RAM 204 and receiving a microcode control word over lines 206 and 208, respectively. The decimal control bits are selected during the operation of extended cycle decimal instructions where the microcode control of the instruction processor is being provided by AD section 98 in a manner which will be more fully explained hereafter. The remaining 19 bits of the 32 control bits provided on line 172 are received on line 198 and used by control logic 200 to provide other control features not necessary to an understanding of the present invention.

Figure 11A:
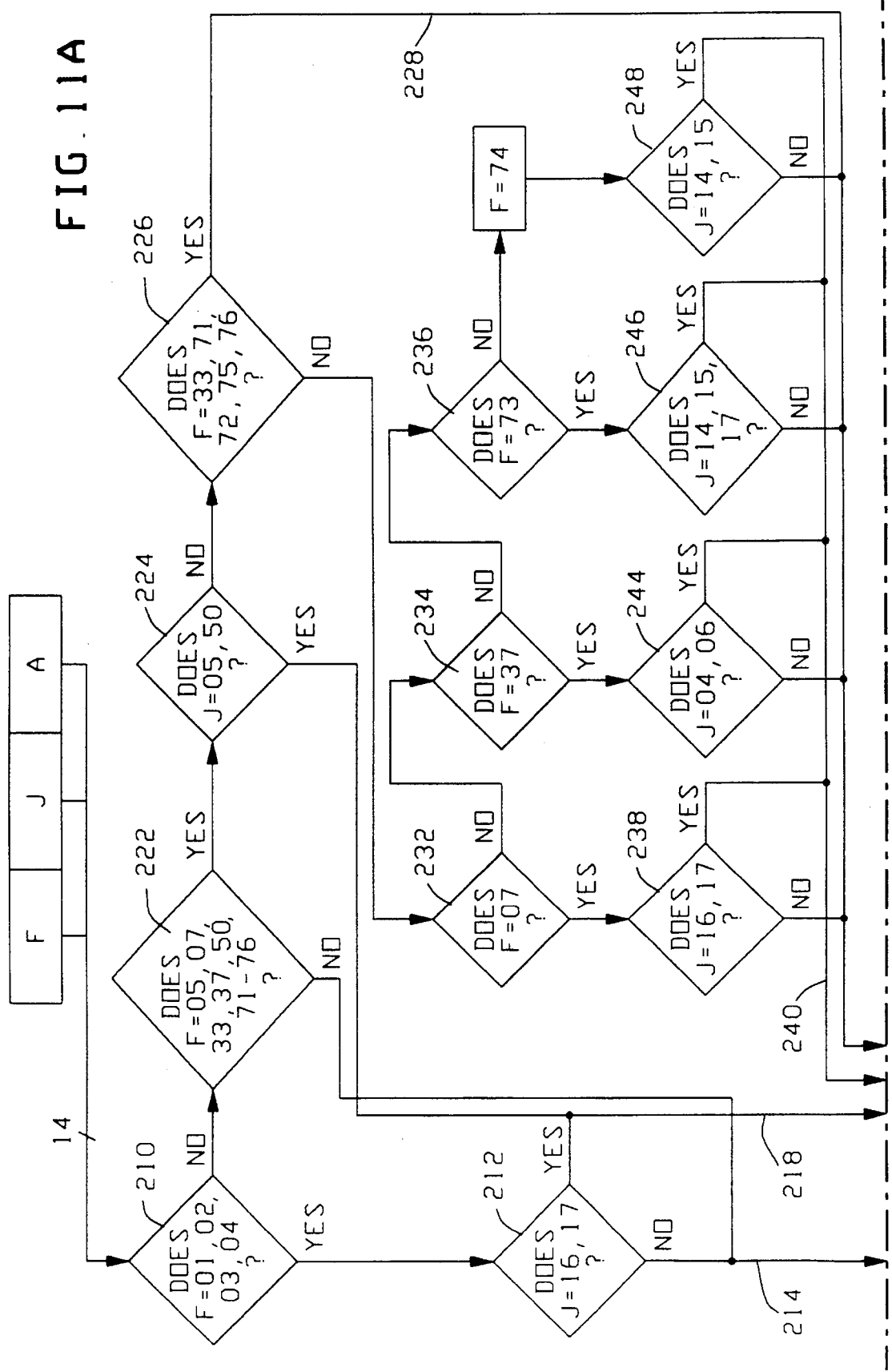
FIG. 11 and FIG. 11B when arranged as in FIG. 11 show the logic used to encode the FJA fields of machine instructions to produce compressed 10-bit vector starting addresses, for selecting microcode instruction sequences for controlling execution of extended cycle machine instructions.
Figures 11, 11B:
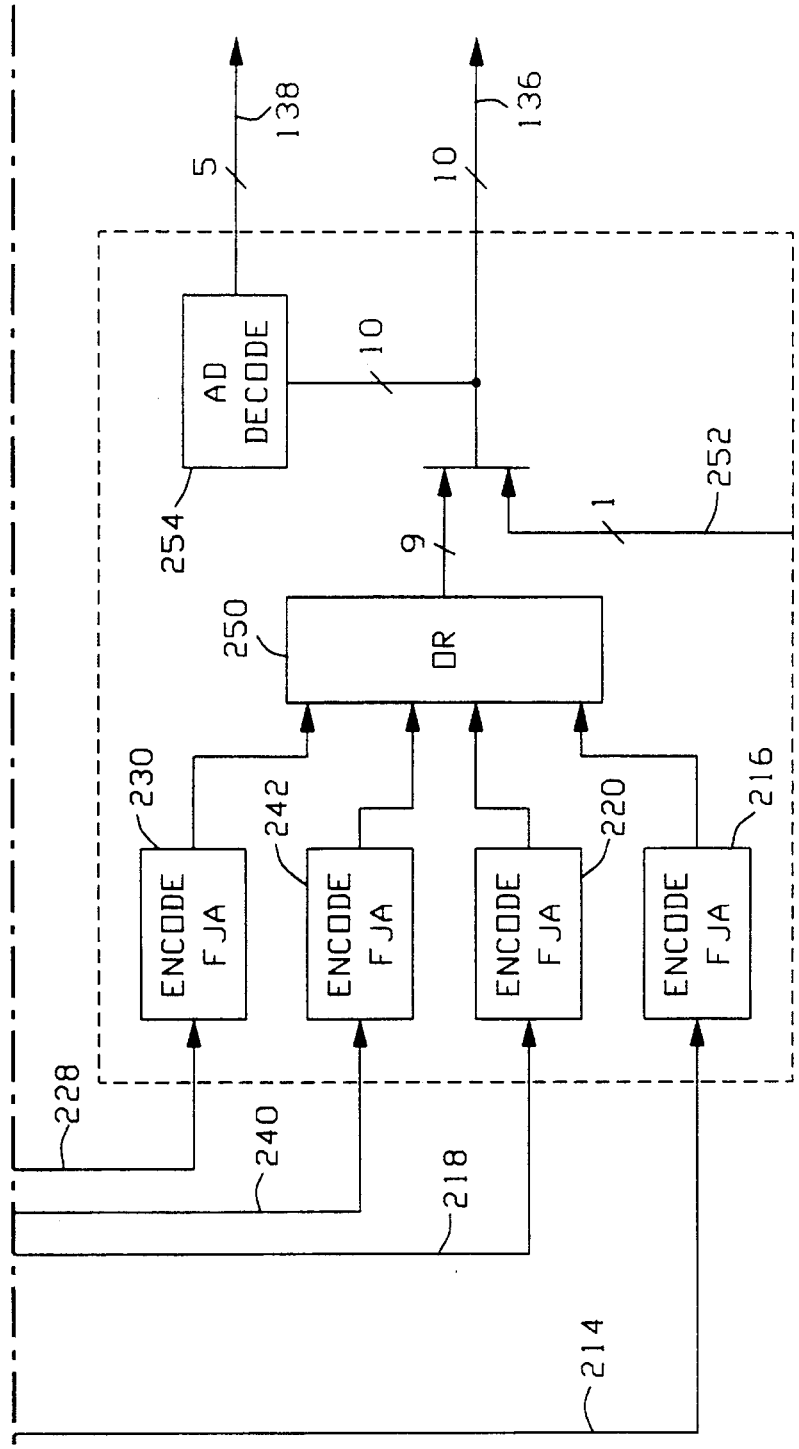

FIG. 11A and 11B when arranged as shown in FIG. 11 show the logic used to encode the FJA-fields to produce the compressed 10-bit vector address. FIG. 11A is a flow diagram of the logic used to analyze the octal representation of the 10 binary bits of the FJA-Fields and to separate the instructions into one of four groups. The fact that the instructions are divided into four groups is not significant. The number of separate groups is dependent upon the specific function codes of the instruction set and can be expected to vary from instruction set to instruction set. What is significant is that the instruction set be divided into unique groups based on the function code.

In FIG. 11A grouping is made by first analyzing the octal representation of the binary bits of the F-Field to determine if they are unique to a particular instruction. Specifically, decision box 210 determines whether the F-Code equals 01, 02, 03, or 04. If it does decision box 212 looks at the A-Field to determine whether it equals 16 or 17. If A does not equal 16 or 17 the instruction proceeds along line 214 to encode logic circuitry labelled Encode F 216, where the instruction is encoded utilizing only the unique bits of the F-Field. In other words, the F-Field bits of any instruction where F=01, 02, 03, or 04 and A does not equal 16 or 17 are unique to that particular instruction and the bits of the J and A-Fields need not be encoded in order to provide a unique address for that instruction. If, in this example, A does equal 16 or 17 then the instruction is provided on line 218 to Encode FA 220 where the bits of both the F and the A-Fields are encoded. Thus, in the case where the F-Field equals 01, 02, 03, or 04 and the A-Field equals either 16, or 17 it is not sufficient to decode only the F-Field bits because they are not unique to a particular instruction. The A-Field bits must also be encoded in order to produce a unique address.

If F does not equal 01, 02, 03, or 04, the instruction proceeds to decision box 222 where the F-Field is again analyzed to determine whether F equals 05, 07, 33, 37, 50, or 71 through 76. If F does not equal any of those numbers the instruction is sent via line 214 to Encode F 216 for decoding. In other words, where F does not equal 01 through 05, 07, 33, 37, 50, or 71 through 76 the F-Field bits are unique to the instruction and are all that needs to be encoded. Where the F-Field does equal any of those octal numbers further encoding is required and the instruction proceeds to decision box 224.

At decision box 224, where F equals 05 or 50 the instruction is provided on line 218 to Encode FA 220. If F does not equal 05 or 50 decision box 226 determines whether F equals 33, 71, 72, 75, or 76. If F does equal one of these numbers the instruction proceeds along line 228 to Encode FJA 230 where all 14 bits of the FJ and A-Fields are encoded.

In decision box 226, if F does not equal 33, 71, 72, 75 or 76 further logic is required to uniquely group the instructions. The only F-Field codes remaining are 07, 37, 73, and 74. The instructions are separated by these remaining F-Fields by decisions boxes 232, 234, and 236. If F equals 07 the instruction is presented to decision box 238 to determine whether the J-Field equals 16 or 17. If the J-Field equals 16 or 17 the instruction is provided on line 240 to Encode FJ 242 where the bits in the F and J-Fields are encoded. If the J-Field does not equal 16 or 17 the instruction is provided to Encode FJA 230 on line 228 where all bits of the FJ and A-Fields must be encoded. Similarly, if F equals 37, decision box 244 determines whether the J-Field equals 04 or 06. If it does the instruction is sent to Encode FJ 242 on line 240. If J does not equal 04 or 06 the instruction is encoded by Encode FJA 230. If F equals 73, decision box 246 determines whether J equals 14, 15, or 17. If the determination is in the affirmative the instruction is encoded by Encode FJ 242 and if in the negative by Encode FJA 230. Finally, if F equals 74 decision box 248 determines whether J equals 14 or 15. If J equals 14 or 15 the instructions is encoded by Encode FA 231. If J does not equal 14 or 15 the instruction is encoded by Encode FJA 230.

As illustrated in FIG. 11B the outputs of the four levels of encode logic are ored at Or Gate 250 to produce the nine least significant bits (LSB) of the 10 bit address vector. The remaining most significant bit of the address vector consists of designation bit 16 (DB16) provided on line 252 which is set automatically by the operating system when a basic mode instruction is being run. In other words the most significant bit is always 1 for a basic mode instruction and zero for an extended mode instruction. This bit is catenated with the 9 LSB's to produce the 10 bit vector address which is provided on line 136 to CS section 128 as seen in FIG. 10. The address is also provided to an AD decode logic circuit 254 which further decodes the address bits to produce a 5 bit microcode address which is provided to AD section 98 on line 138. This address is used as the starting microcode address for the micro operations for certain decimal instructions, the execution of which is controlled by the AD section in a manner which will be more fully described hereafter.

Thus, the FJA encode logic circuit 132 can be seen to produce a unique 10 bit vector address for each machine instruction by encoding only those bits necessary to uniquely identify the instruction. For example, in accordance with FIG. 11A, if F=03 and A does not equal 16 or 17, then only the F field of the instruction need be encoded. If however, F=03 and A=16 or 17, then both the F and A fields must be encoded. Similarly, if F=33, then the F, J and A fields all must be encoded. In order to further clarify the encoding logic reference may be had to FIG. 12 which is a listing of the various machine instructions. FIG. 12 sets forth the mnemonic symbol for each instruction as well as the octal equivalent of the field or fields which must be encoded as well as the resultant encoded vector address.

2. General Operation of Dual Hardware/Microcode Control

FIGS. 13A, 13B, 14, and 15 illustrate the various sources of control for the instruction pipeline.

Figure 13A:
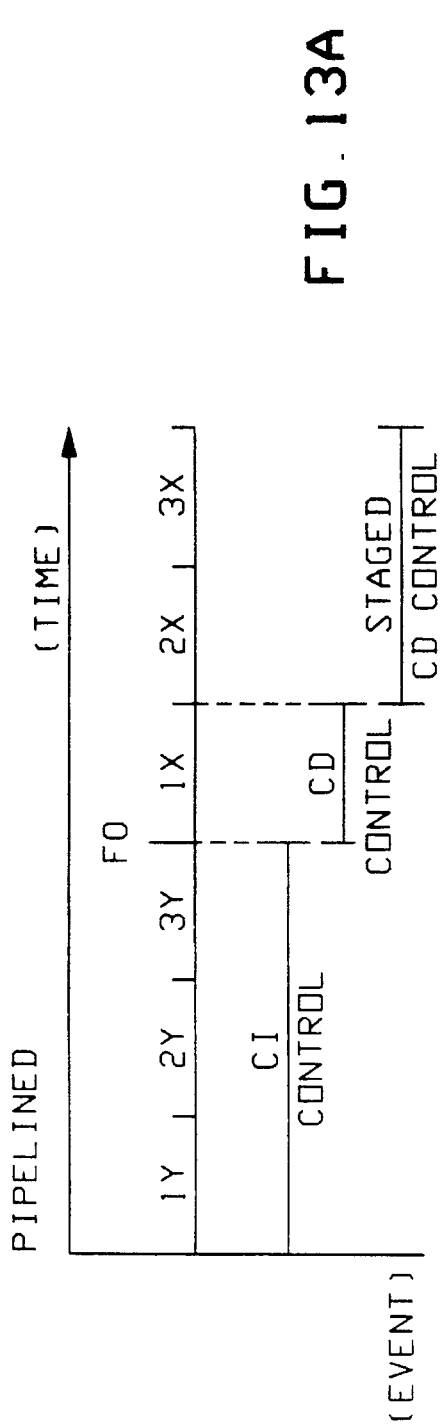
FIG. 13A illustrates the sources of control for the execution of pipelined instructions and FIG. 13B illustrates the sources of control for execution of non-piplined instructions.
Figure 13B:
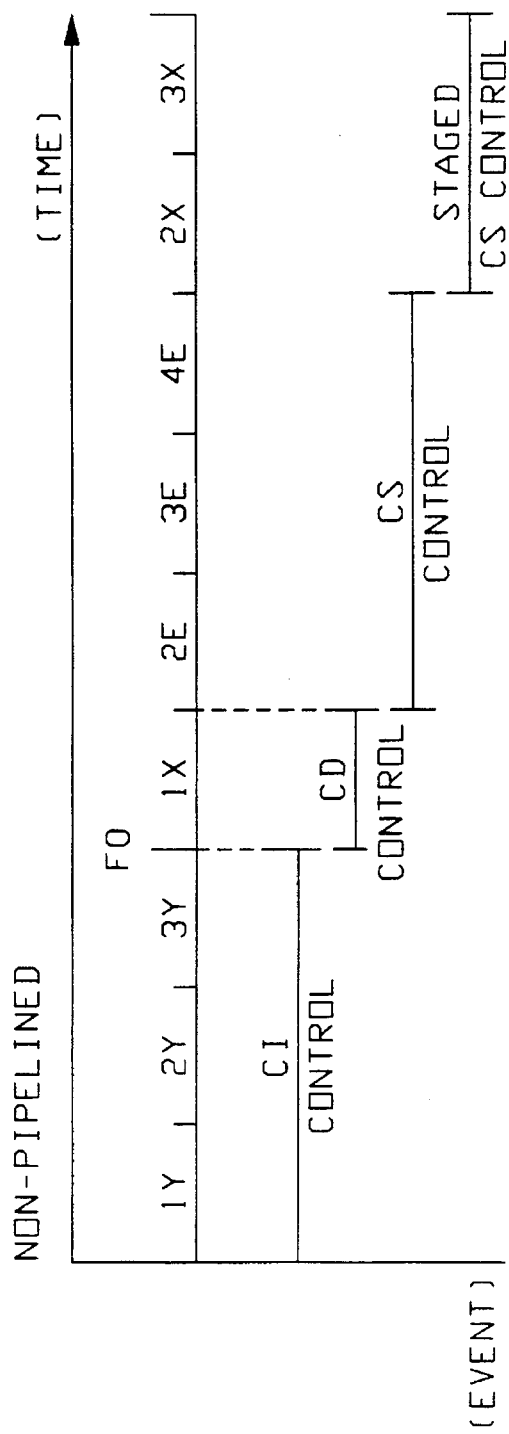

FIG. 13A illustrates the sources of control for the execution of pipelined (standard) instructions, and FIG. 13B illustrates the source of control for nonpipelined (extended cycle) instructions. In the case of both pipelined and nonpipelined instructions, the Instruction Fetch windows (1Y, 2Y, 3Y) are controlled by Instruction Address Generate section (CI) 50. When the instruction is loaded in the Instruction Register (FO) 59, the Instruction Decode section (CD) 58 provides hardware control for instruction execution for the 1X window. In fully pipelined operation, the 2X and 3X windows are controlled by staged control information supplied by the Instruction Decode section (CD) 58 during the 1X cycle.

In nonpipelined operation an extended cycle instruction signal (CD-SEL-SC-CTRL) generated by the Instruction Decode section (CD) 58 goes active and control is passed to the main Control Store (CS) 128. Control of the instruction pipeline is then provided by CS microcode for each particular extended instruction. The CS section remains in control for the remainder of the extended cycle instruction. One minor cycle prior to the start of the next to last major cycle (2X), a microcode bit (CLR-SLIPN-DES) goes active and returns control back to the CD section in a manner which will be described in more detail later. As mentioned previously, the extended cycles are referred to as E cycles (2E, 3E, 4E, and so on) while the last two cycles of the instruction are labelled 2X and 3X.

Figure 14:
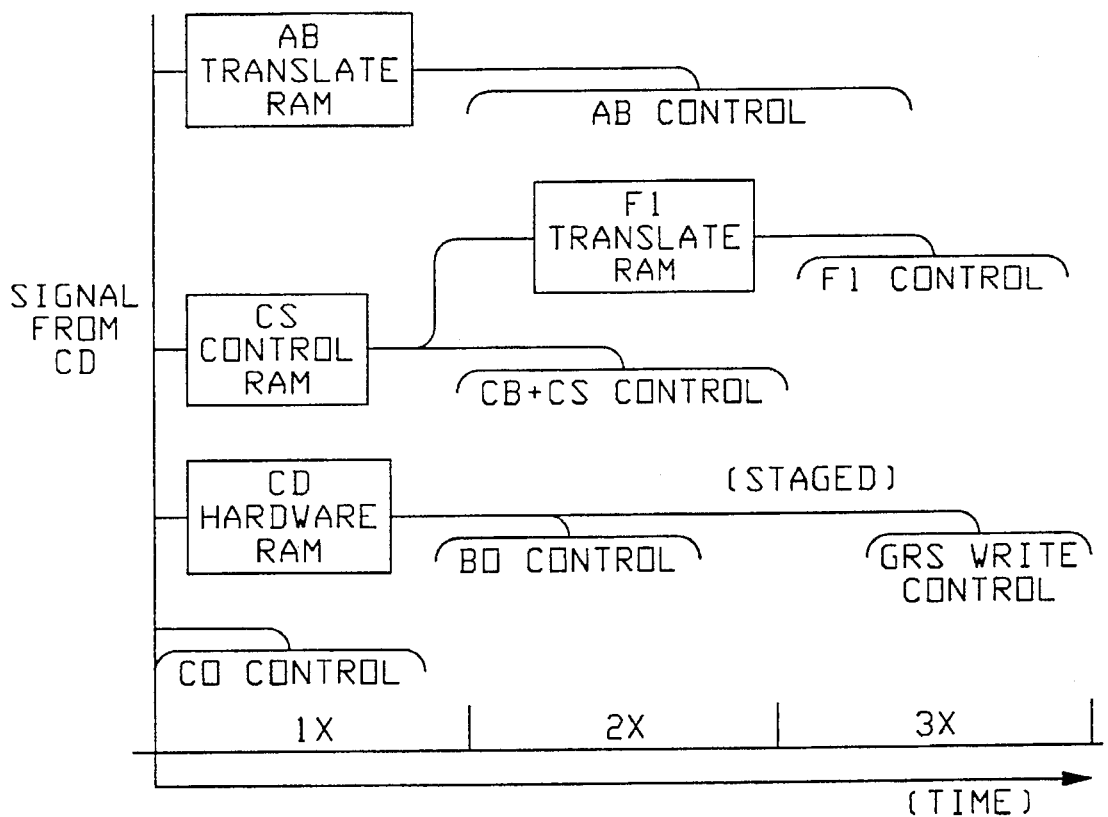
FIG. 14 is a diagram illustrating the staging of control signals sent to various sections of the instruction processor during the execution of standard instructions.

FIG. 14 is a timing diagram illustrating the timing of control signals sent to various sections of the Instruction Processor during the execution of fully pipelined instructions. The control is shown over the 1X, 2X, and 3X windows. During instruction execution, the Instruction Register FO 59 is loaded at the beginning of the 1X window, and there is immediate hardware control for the early 1X window. CD 58 hardware control based upon decode logic and bits addressed and read from a Translate RAM provides Operand Cache control for the 2X window and staged control for the GRS write data. For example, on an Add A instruction, it would provide the write controls. During the 1X window CD also provides a unique address to the main control store RAM located in the CS section. This addresses a single microinstruction which provides control for the CB section 120 and for the CS section 128 for the 2X window. The CS Microcode Control RAM also provides an address to a Translate RAM located in the FI section for addressing a single microinstruction providing interrupt control for the 3X window. During the 1X window the CD section also sends a unique address to the AB section which provides AB control for the 2X and first half of the 3X window.

Figure 15:
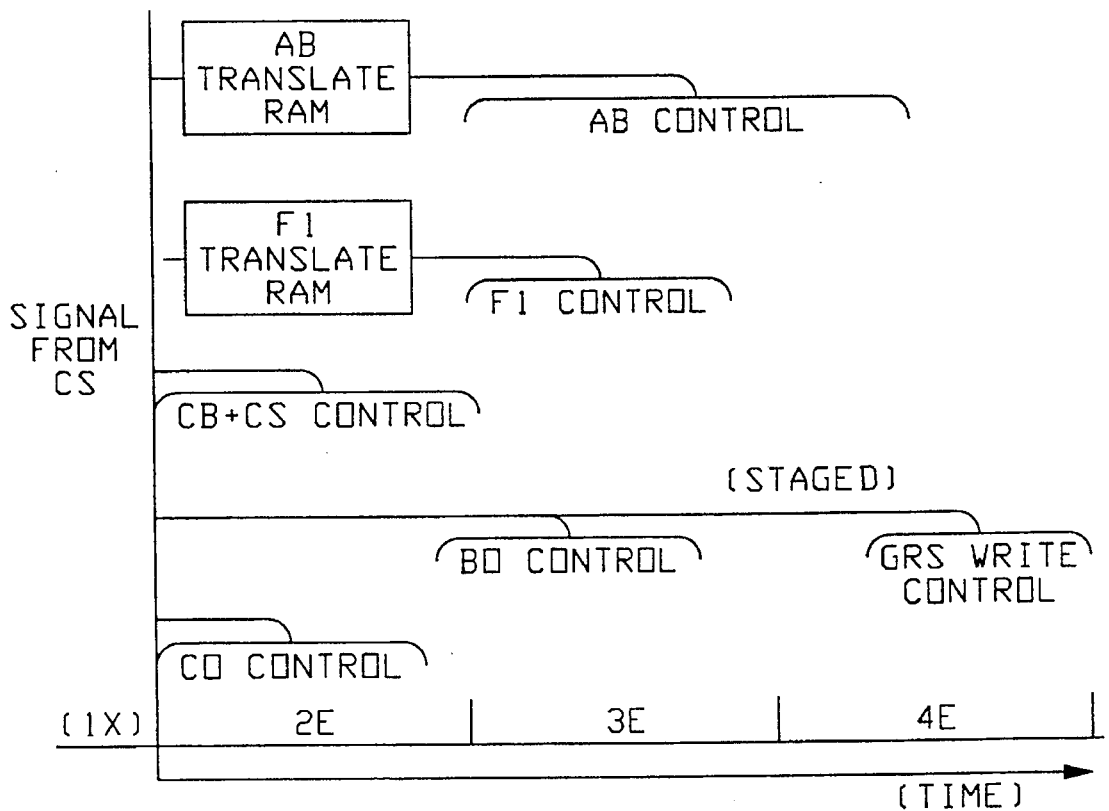
FIG. 15 is a diagram illustrating the staging of control signals sent to various sections of the instruction processor during the execution of an extended cycle (non-overlapped) instruction.

FIG. 15 is a timing diagram illustrating the timing of control signals sent to various sections of the instruction processor during the execution of nonpipelined instructions. In this situation an extended cycle instruction is being executed and the 1X window is complete. The CD-SEL-CS-CTRL signal has been made active and control has passed to the CS section. The CS section initiates microcode control by utilizing the unique vector address provided for each machine instruction from the CD section. This address is provided to the CS section allowing access into an initial micro table in the CS microcode RAM 148 which contains the first microinstruction of the microprogram used to complete execution of the machine instruction. The results of that microinstruction are available at the end of the third phase of the first cycle (1X 2B) and are latched into a register with the control information being available at that time. The microinstruction provides CO control for the 2E window. It also provides control to the CB section and for the next microinstruction from the main control store. As in the case of CD control for pipelined instructions CS provides operand cache control (BO) and staged control for GRS write in the 4E window. It also provides control to the AB section. A comparison of FIGS. 14 and 15 indicate that for extended cycle instructions the CS sections provides the same types of control as does the CD section in the case of pipelined instruction except that for interrupt control (FI) the control is always provided from the CS microcode RAM.

3. Control of Main Microcode Controller by Separate Sequence Microcode Controller This feature of the present invention can be understood with reference to FIGS. 10, 17 and 18. Referring to FIG. 10, during certain extended cycle decimal instructions microcode control of the instruction execution pipeline is provided by AD microcode under control of AD Microcode Controller 202 by slaving the CS Microcode Controller 164 to the AD Microcode controller. 'Slaving' indicates that the AD Microcode Controller 202 exercises primary control of execution of decimal instructions and the CS Microcode Controller 164 relinquishes primary control during such execution.

When the FJA fields of a machine instruction are encoded by FJA Encode Logic circuit 132, a 5-bit address is provided to AD section 98 on line 138. This address is received by AD Microcode Controller 202 and is used to address AD Microcode RAM 204 on line 206. AD Microcode RAM 204 provides microcode control bits on line 208 to AD Microcode Controller 202. These control bits are used to control the function of the AD section 98 during execution of the decimal machine instruction, and include address bits which allow the AD microcode to branch to other microinstructions necessary to complete operation of the machine instruction.

Since the timing and sequencing of storage and GRS references are fixed for most decimal instructions, the CS Microcode Controller 164 and AD Microcode Controller 202 can usually operate in a synchronized manner by passing data on fixed clock cycles. However, for those decimal instructions where storage and GRS referencing are not fixed, this feature of the present invention allows AD Microcode Controller 202 to control the transfer of GRS and storage data by controlling the activity of CS Microcode Controller 164. This is accomplished through the use of the 3-bit index field which is provided to CS Microcode Controller 164 on line 196.

Figure 17:
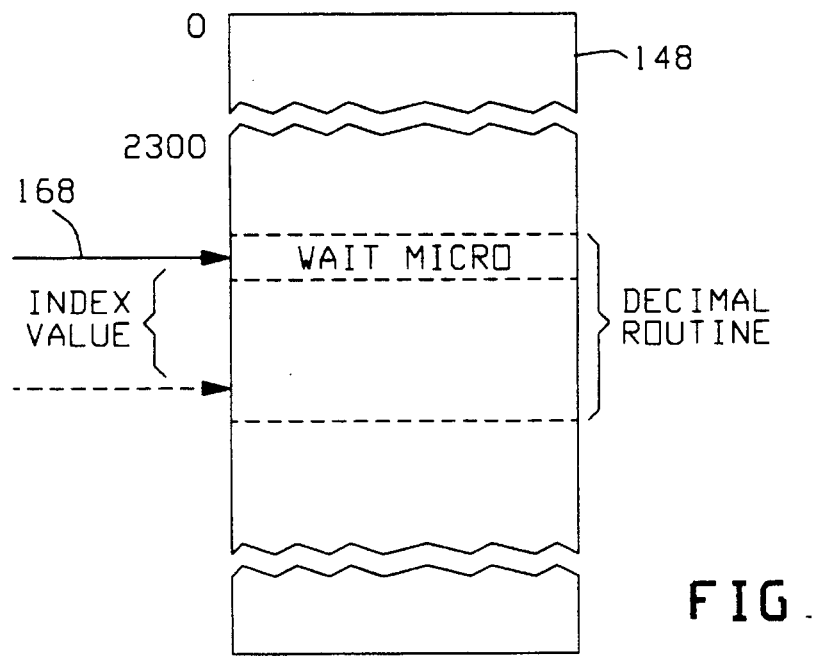
FIG. 17 is a memory map of CS microcode memory showing the indexed addressing of a decimal routine used when certain extended cycle decimal machine instructions are executed.

Control of CS Microcode Controller 164 by AD Microcode Controller 202 through use of the 3 bit index field can be understood with respect to FIGS. 17 and 18. FIG. 17 is a memory map of CS Microcode RAM 148 showing the addressing of a decimal routine used when certain extended cycle decimal instructions are executed. Once the initial machine instruction setup is complete, CS Microcode Controller 164, generates a branch address on line 162 which branches to the first address of a microinstruction routine dedicated to a particular decimal instruction. This location contains a "wait" microinstruction which contains address bits which are a branch to itself plus an index value supplied by the 3-index bits of AD Microcode Controller 202. When no transfers to or from GRS or storage are required a zero index value is provided by AD Microcode Controller 202.

FIG. 18 is a diagram of a portion of the logic used to generate the CS Branch Microcode addresses for completing execution of extended cycle instructions. Multiplexer 182 receives input signals from Dynamic Conditions 183 via line 190, Interrupt Conditions 192, via line 194, and from AD Microcode Controller 202 via line 196, which is the zero index value described above. For decimal instructions, the CS Microcode RAM 148 provides signals on line 172 such that a control signal provided on line 186 causes selection of the zero index to be provided to OR Gate 176 via line 184. Signals are provided via line 198 to Control Logic 200, and via line 174 to be combined with the signal on line 180 to form the output on line 162. The zero index will have no effect on the output of OR Gate 176 so the microcode will loop ("wait" microinstruction) at the first table address. When AD Microcode Controller 202 determines that a data transfer is required, it sends a non-zero index value in the index field. This non-zero index value, when provided to OR Gate 176, will cause the CS microcode to branch to a CS microinstruction which is the first instruction in a microcode routine, which, in turn, accomplishes the requested data transfer. When the routine is complete, the last microinstruction of the routine contains address bits which cause a branch back to the 'wait' microinstruction plus the AD index field. If the AD index field is zero the CS Microcode Controller 164 will branch to the wait microinstruction.

When the decimal instruction is complete, AD Microcode Controller 202 will provide an AD index field to CS Microcode Controller 164 on line 196 which causes a branch to a CS microinstruction which de-activates the CD slip state. This is accomplished by providing the CLR SLP bit on line 158 which clears Latch 154. When Latch 154 is cleared, a zero control signal is provided on line 152 causing Pipeline Selector 144 multiplexer to select the hardware control signal provided by hardware Decode Logic 134 on line 142 in the manner previously described.

4. Pipeline Control: Summary

Figure 19:
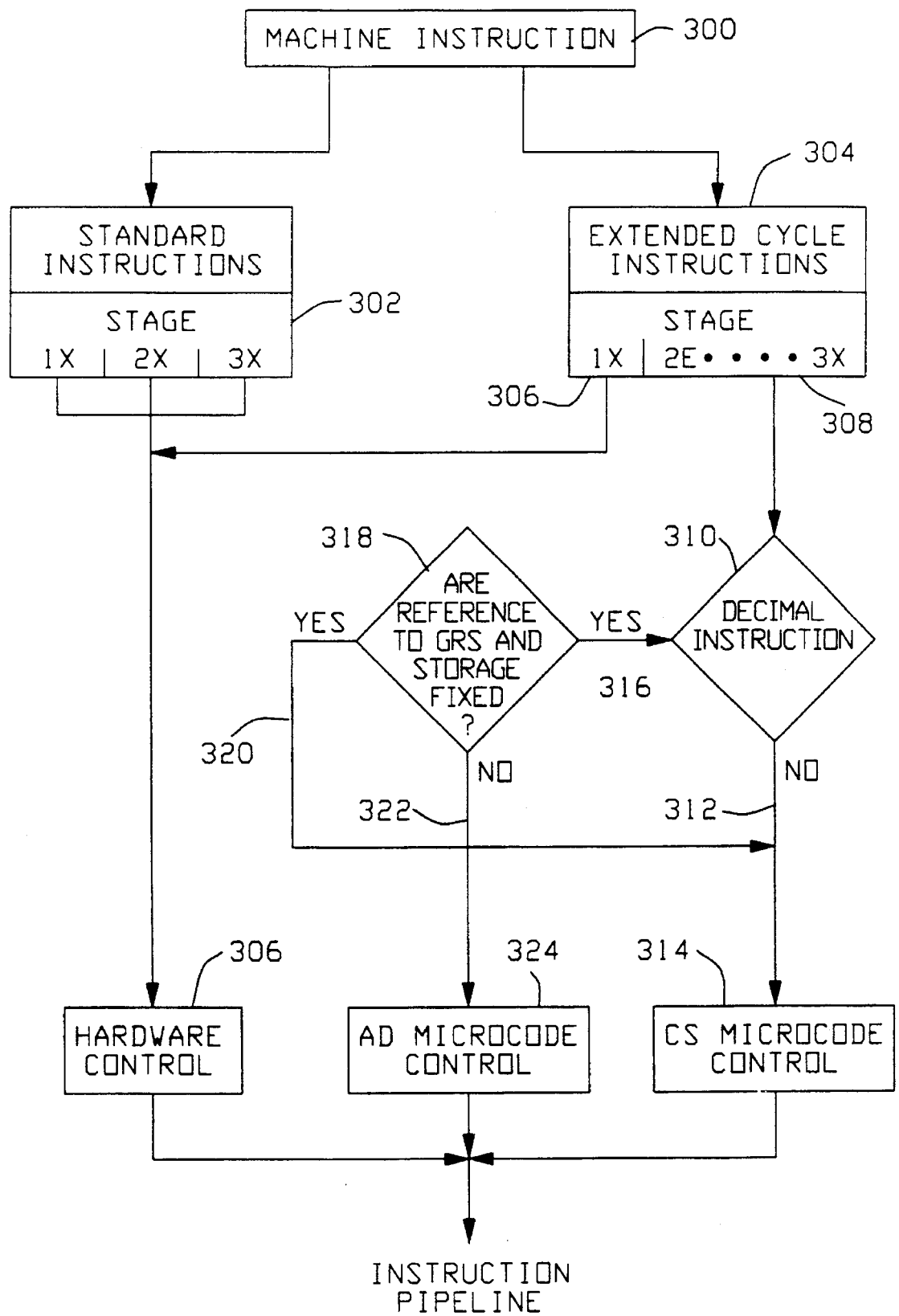
FIG. 19 is a flow chart of the selection of instruction execution control based upon the type of machine instruction being executed.

The overall operation of the dual hardware/microcode control system of the data processing system can be understood with respect to FIG. 19, which is a flow chart of the control selection based upon the type of machine instruction being executed. Machine Instructions 300 are separated into two basic types, a first class of Standard Instructions 302, and a second class of Extended Cycle Instructions 304. In the case of standard instructions, control is selected such that Hardware Control is provided for all three stages, 1X, 2X and 3X. For extended cycle instructions it can be seen that the 1X stage 306 is Hardware Controlled in the same manner as for Standard Instructions. Control for the 2E-3X Stages 308 depend upon the type of extended cycle instruction being executed. The instruction is tested to determine if it is a Decimal Instruction 310, and if it is not a Decimal Instruction the NO path 312 is taken, and control is provided by CS Microcode. If it is a Decimal Instruction YES path 316 is taken and control depends upon whether References To GRS and Storage are Fixed 318. If they are fixed, YES path 320 is taken and control is again handled by CS Microcode Control 314. If the GRS and Storage References are not fixed NO path 322 is taken and control is provided by AD Microcode Control 324, with CS Microcode Controller 164 being slaved to AD Microcode Controller 202 as previously described. Although this feature of the present invention is utilized to provide pipeline control for certain extended cycle decimal instructions it would be obvious to one skilled in the art that one or more separate microcode controllers could be used in connection with other types of instructions. For example, the main microcode controller could be slaved to one or more separate microcode controllers during the execution of other predetermined instruction type or types without departing from the scope of the present invention.

CONCLUSION

In view of the detailed descriptions and drawings, various modifications or implementations will become apparent to those skilled in the art without departing from the spirit and scope of invention, and what is described to be protected by Letters Patent is set forth in the appended claims.

What is claimed:

1. For use in a data processing system having an instruction processor capable of executing a first class of machine instructions in a predetermined number of execution cycles, and a second class of machine instructions in variable numbers of execution cycles in excess of the predetermined number of cycles, an instruction execution control system comprising:

decode means for receiving and decoding each machine instruction for providing operation control signals for each machine instruction and for determining whether the machine instruction is in the first class of machine instructions or second class of machine instructions, and including selection means for alternatively providing signals for selecting between said operation control signals indicative of the first class of machine instructions and said operation control signals indicative of the second class of machine instructions;

first controller means coupled to said decode means for controlling execution of each machine instruction in the first class of machine instructions in the predetermined number of execution cycles, and for controlling execution of a predetermined portion of the execution cycles for each machine instruction in the second class of machine instructions; and second controller means coupled to said decode means and independently operable from said decode means for controlling execution of the remaining execution cycles not controlled by said first controller means of each machine instruction in the second class of machine instructions.

2. An instruction execution control system as in claim 1 wherein said first controller means includes electronic circuit means for providing control signals for each of the instructions in the first class of machine instructions for controlling the execution of the instruction in response to said operation control signals and said first class selection signals.

3. An instruction execution control system as in claim 1 wherein said second controller means includes:

microcode controller means having predetermined microcode control programs for controlling execution of each machine instruction in the second class of machine instructions; and microcode control program selection means for selecting one of said microcode control programs in response to said operation control signals and said second class selection signals.

4. For use in a data processing system as in claim 1 and further having a third class of arithmetic machine instructions differing from arithmetic instructions in the first class and second class of machine instructions, wherein said decode means further includes a third class of arithmetic machine instruction decode means for providing third class operation control signals for each machine instruction in the third class of arithmetic machine instructions; and third controller means coupled to said decode means and said second controller means for controlling execution of each arithmetic machine instruction in the third class of arithmetic machine instructions in response to said third class operation control signals.

5. An instruction execution control system as in claim 4 wherein said third controller means includes:

second microcode controller means having second predetermined microcode control programs for controlling execution of each machine instruction in the third class of arithmetic machine instructions; and second microcode control selection means for selecting one of said second predetermined microcode control programs in response to said third class operation control signals.

6. An instruction execution control system as in claim 5 wherein said third controller means includes means for controlling said second controller means for controlling execution of machine instructions in the third class of arithmetic machine instructions.

7. An instruction execution control system as in claim 1, wherein said predetermined portion of the execution cycles for machine instructions in the second class of machine instructions which are controlled by said first controller means comprises a predetermined portion of the execution cycles starting at the first execution cycle for the machine instruction being executed.

8. For use in a data processing system an instruction processor capable of executing a first class of machine instructions in a predetermined number of major clock cycles and a second class of machine instructions in variable numbers of major clock cycles in excess of the predetermined number of cycles, where each machine instruction execution involves an instruction fetch function in a fixed number of major clock cycles and an instruction execution function in a fixed number of major clock cycles for the first class of machine instructions or a variable number of major clock cycles for the second class of machine instructions, a pipelined instruction execution control system comprising:

decode means for receiving and decoding each machine instruction for providing operation control signals for each machine instruction and for determining in the fixed number of major clock cycles whether the machine instruction is in the first class or second class of machine instructions, and including selection means for alternatively providing first class selection signals or second class selection signals;

first controller means coupled to said decode means for controlling execution of each machine instruction in the first class of machine instructions in the fixed number of major clock cycles, and for controlling execution of a predetermined portion of the major clock cycles for each machine instruction in the second class of machine instructions; and second controller means coupled to said decode means and independently operable from said decode means for controlling execution of the remaining major clock cycles not controlled by said first controller means of each machine instruction in the second class of machine instructions in the required number of major clock cycles for each of the decoded machine instructions;

instruction sequence means coupled to said decode means and said first controller means for performing instruction fetch of the next selected machine instruction during the instruction execution function of the current machine instruction; and pipeline suspension means coupled to said decode means, said second controller means and said instruction sequence means for suspending the instruction fetch function for subsequent instructions when the current machine instruction is in the second class of machine instructions.

9. An instruction execution control system as in claim 8, wherein said predetermined portion of the execution cycles for machine instructions in the second class of machine instructions which are controlled by said first controller means comprises a predetermined portion of the execution cycles starting at the first execution cycle for the machine instruction being executed.

10. An instruction execution control system as in claim 8 wherein said first controller means includes electronic circuit means for providing control signals for each of the instructions in the first class of machine instructions for controlling the execution of the instruction in response to said operation control signals and said first class selection signals.

11. An instruction execution control system as in claim 8 wherein said second controller means includes:

microcode controller means having predetermined microcode control programs for controlling execution of each machine instruction in the second class of machine instructions; and microcode control program selection means for selecting one of said microcode control programs in response to operation control signals and said second class selection signals.

12. An instruction execution control system as in claim 8 further including pipeline activation control coupled to said second controller means for reactivating the instruction fetch function for the next instruction prior to completion of the instruction execution function of the current machine instruction in the second class of instructions.

13. For use in a data processing system as in claim 8 and further having a third class of arithmetic machine instructions differing from arithmetic instructions in the first class and second class of machine instructions, wherein said decode means further includes a third class of arithmetic machine instruction decode means for providing third class operation control signals for each machine instruction in the third class of arithmetic machine instructions and for providing third class selection signals; and third controller means coupled to said decode means and said second controller means for controlling execution of each arithmetic machine instruction in the third class of arithmetic machine instructions in response to said third class operation control signals.

14. An instruction execution control system as in claim 13 wherein said third controller means includes:

second microcode controller means having second predetermined microcode control programs for controlling execution of each machine instruction in the third class of arithmetic machine instructions; and second microcode control selection means for selecting one of said second predetermined microcode control programs in response to said third class operation control signals.

15. An instruction execution control system as in claim 14 wherein said third controller means includes means for controlling said second controller means for controlling execution of machine instructions in the third class of arithmetic machine instructions.

16. A digital instruction processor control system providing control for pipelined execution of machine instructions in pipelined stages, wherein a first class of the machine instructions can be executed in a predetermined number of execution stages and a second class of the machine instructions require variable numbers of execution stages, the control system comprising:

instruction register means for receiving and temporarily storing the machine instructions, each machine instruction including a number of operation defining bits;

hardware control means coupled to said instruction register means for receiving and decoding each machine instruction, and four generating in response thereto hardware control signals for controlling the pipelined execution of first selected ones of the machine instructions in the first class of machine instructions;

address generating means coupled to said instruction register means and responsive to the operation defining bits of the machine instruction for generating a unique starting microcode address for second selected ones of the machine instructions in the second class of machine instructions;

main microcode memory means for receiving said starting microcode addresses and providing in response thereto branch microcode control words, and for providing microcode control signals in response to branch microcode target addresses for controlling the pipelined execution of said second selected ones of the machine instructions in the second class of machine instructions;

main microcode control means connected to said main microcode memory means for receiving said branch microcode control words and for providing said branch microcode target addresses to said main microcode memory means to address said microcode control signals;

selection signal generating means coupled to said instruction register means and responsive to the machine instructions for generating selection signals identifying each of the machine instructions as one of the first class of machine instructions or one of the second class of machine instructions;

address selection means coupled to said main microcode memory means and coupled to said selection signal generating means and responsive to said selection signals, for selecting said starting microcode addresses for the first execution stage of the second class of machine instructions, or selecting said branch microcode target address for execution stages subsequent to the first execution stage of the second class of machine instructions; and control selection means for receiving said hardware control signals and said microcode control signals and responsive to said selection signals for selecting said hardware control signals for the first class of machine instructions or selecting the first execution stage of the second class of machine instructions or selecting said microcode control signals for all execution stages subsequent to the first execution stage of the second class of machine instructions.

17. The digital instruction processor control system of claim 16, wherein said hardware control means further includes memory means responsive to the machine instruction for providing combined control signals such that said hardware control signals are comprised of both hardware decode control signals and memory addressed control signals.

18. The digital instruction processor control system of claim 16, wherein said address generating means includes encode logic means for compressing a predetermined number of said operation defining bits down to said starting microcode address containing a smaller number of bits, allowing the portion of addressable memory of said main microcode memory means containing microcode control signals to be minimized by reducing the required number of said starting microcode addresses for said addressable memory.

19. The digital instruction processor control system of claim 16, further comprising:

second microcode control means coupled to said address generating means for providing second starting microcode addresses and second branch microcode target addresses in response to a predetermined machine instruction type, and for generating an index signal indicative of said predetermined machine instruction type;

second microcode memory means for receiving said second starting microcode addresses and said second branch microcode target addresses from said second microcode control means, and providing in response thereto additional microcode control signals for controlling the pipelined execution of the predetermined machine instruction type; and indexing means responsive to said index signal for controlling said branch microcode target addresses provided by said main microcode control means, whereby said main microcode control means is directly controlled by said second microcode control means during the execution of said predetermined machine instruction type.

20. A microcode control system for a digital data processing system comprising:

instruction register means for sequentially receiving and holding machine instructions, each machine instruction including a number of operation defining bits;

address generating means coupled to said instruction register means and responsive to the operation defining bits of the instruction for generating a unique starting microcode address for each instruction;

main microcode memory means coupled to said address generating means for receiving the starting microcode address for each instruction and providing in response thereto initial microcode control signals for instruction execution control;

main microcode control means coupled to said main microcode memory means for providing branch microcode target addresses for accessing said main microcode memory means;

second microcode control means coupled to said address generating means for selectively providing the starting microcode address and branch microcode addresses in response to a predetermined instruction type and for generating an address index signal indicative of said predetermined instruction type;

second microcode memory means for receiving microcode addresses from said second microcode control means and providing in response thereto additional microcode control signals for instruction execution control of said predetermined instruction type; and address indexing means responsive to said address index signal for controlling the branch microcode target address provided by said main microcode control means, whereby said main microcode control means is controlled by said second microcode control means during the execution of said predetermined instruction type.

21. A method for controlling the execution of machine instructions in a data processing system having an instruction processor including an instruction decode section decode, a first controller, a second controller having a first microcode controller and a first microcode memory, and a third controller having a second microcode controller and a second microcode memory, and being capable of executing a first class of machine instructions in a predetermined number of execution cycles and a second class and a third class of machine instructions in variable numbers of execution cycles in excess of the predetermined number of cycles, the method comprising the steps of:

decoding the machine instruction;

generating a first selection signal if the machine instruction is in the first class of machine instructions;

generating a second selection signal if the machine instruction is in the second class of machine instructions;

selecting, in response to said first selection signal, control signals from the first controller for directly controlling pipeline execution control of the first class of machine instructions;

selecting, in response to said second selection signal, control signals, from the second controller for directly controlling pipeline execution of the second class of machine instructions;

generating a starting microcode address unique to each instruction in the third class of machine instructions;

addressing the second microcode memory with the starting microcode address for providing initial microcode control signals for controlling execution of the third class of machine instruction;

generating an address index signal indicative of the third class of machine instructions;

generating branch microcode target addresses for addressing the second microcode memory for providing subsequent microcode control signals necessary to complete execution of the third class of machine instructions; and controlling in response to said address index signal the generation of said branch microcode target addresses used to access the first microcode memory, whereby during the execution of the third class of machine instruction the first microcode controller is controlled by the second microcode controller.

22. A method for controlling the execution of machine instructions in a digital instruction processor, capable of executing a first class of machine instructions in a predetermined number of execution cycles and a second class of machine instructions in variable numbers of execution cycles in excess of the predetermined number of cycles, the instruction processor including a machine instruction decode section, a hardware control section and a microcode control section having a main microcode memory, the method comprising the steps of:

decoding the machine instruction;

generating hardware control signals for controlling execution of the first class of machine instructions;

generating a starting microcode address unique to each instruction in the second class of machine instructions;

addressing a main microcode memory with the starting microcode address for providing initial microcode control signals for controlling execution of the second class of machine instructions;

generating branch microcode target addresses for addressing said main microcode memory for providing subsequent microcode control signals necessary to complete execution of the second class of machine instructions;

generating a selection signal which identifies the instruction as a class one instruction or as a class two instruction; and selecting, in response to said selection signals, the hardware control signals for directly controlling the pipeline execution of the first class of machine instructions and of the first cycle of the second class extended cycle machine instructions, and selecting said microcode control signals for all subsequent cycles of the second class of machine instructions.

23. For use in a data processing system having an instruction processor capable of executing a first class of machine instructions in a predetermined number of execution cycles, and a second class of machine instructions in variable numbers of execution cycles in excess of the predetermined number of cycles, an instruction execution control system comprising:

decode control circuitry having inputs to receive each machine instruction, and having outputs to provide operation control signals in response to each machine instruction, and having decode circuitry to determine whether the machine instruction is in the first class or second class of machine instructions, and further having selection circuitry to alternatively provide first class selection signals or second class selection signals in response to the decode of each machine instruction;

first execution control circuitry coupled to said decode control circuitry and to said selection circuitry to control execution of each machine instruction in the first class of machine instructions in the predetermined number of execution cycles in response to said first class selection signals, and to control execution of a predetermined portion of the execution cycles for each machine instruction in the second class of machine instructions; and second execution control circuitry coupled to said decode control circuitry and to said selection circuitry and independently operable from said decode control circuitry to control execution of the remaining portion of the execution cycles not controlled by said first controller means of each machine instruction in the second class of machine instructions in response to said second class selection signals in the required number of execution cycles for each of the decoded machine instructions.

24. An instruction execution control system as in claim 23 wherein said first execution control circuitry includes control signal circuitry to generate and output control signals for each of the instructions in the first class of machine instructions in response to said operation control signals and said first class selection signals.

25. An instruction execution control system as in claim 24, wherein each said control signal controls execution of one stage of a multi-stage pipeline.

26. An instruction execution control system as in claim 23 wherein said second execution control circuitry includes:

a microcode controller having predetermined microcode control programs to provide microcode control signals to control execution of each machine instruction in the second class of machine instructions; and a microcode control program selection circuit coupled to said microcode controller to select one of said microcode control programs in response to said operation control signals and said second class selection signals.

27. An instruction execution control system as in claim 26, wherein each said microcode control signal controls execution of one stage of a multi-stage pipeline.

28. An instruction execution control system as in claim 23, further having a third class of arithmetic machine instructions differing from arithmetic instructions in the first class and second class of machine instructions, wherein said decode control circuitry further includes a third class of arithmetic machine instruction decode circuitry to provide third class operation control signals for each machine instruction in the third class of arithmetic machine instructions; and third execution control circuitry coupled to said decode control circuitry, to said selection circuitry, and to said second execution control circuitry to control execution of each arithmetic machine instruction in the third class of arithmetic machine instructions in response to said third class operation control signals.

29. An instruction execution control system as in claim 28 wherein said third execution control circuitry includes:

- a second microcode controller having second predetermined microcode control programs to control execution of each machine instruction in the third class of arithmetic machine instructions; and
- a second microcode control program selection circuit coupled to said second microcode controller to select one of said second predetermined microcode control programs in response to said third class operation control signals.

30. An instruction execution control system as in claim 29 wherein said third execution control circuitry includes circuitry to control said second execution control circuitry to control execution of machine instructions in the third class of arithmetic machine instructions.

* * * * *